(12) United States Patent
Ohtomo et al.

(10) Patent No.: US 9,544,575 B2
(45) Date of Patent: Jan. 10, 2017

(54) IMAGE ACQUIRING DEVICE AND IMAGE ACQUIRING SYSTEM

(75) Inventors: Fumio Ohtomo, Asaka (JP); Hitoshi Otani, Itabashi-ku (JP); Masayuki Momiuchi, Itabashi-ku (JP); Kazuki Osaragi, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 318 days.

(21) Appl. No.: 13/610,926

(22) Filed: Sep. 12, 2012

(65) Prior Publication Data
US 2013/0076862 A1 Mar. 28, 2013

(30) Foreign Application Priority Data

Sep. 28, 2011 (JP) .................................. 2011-212479

(51) Int. Cl.
*H04N 13/02* (2006.01)
*G06K 9/62* (2006.01)
(Continued)

(52) U.S. Cl.
CPC ......... *H04N 13/0257* (2013.01); *B64C 39/024* (2013.01); *B64D 47/08* (2013.01);
(Continued)

(58) Field of Classification Search
USPC .......... 356/328, 326, 305, 303, 456; 348/46; 392/191
See application file for complete search history.

(56) References Cited

U.S. PATENT DOCUMENTS 4,256,405 A * 3/1981 Fjarlie ........................... 356/454
4,654,872 A 3/1987 Hisano et al.
(Continued)

FOREIGN PATENT DOCUMENTS

CN 1995987 A 7/2007
CN 101692052 A 4/2010
(Continued)

OTHER PUBLICATIONS

Chinese communication, with English translation, issued Jun. 26, 2014 in corresponding Chinese patent application No. 201210367333.9.

*Primary Examiner* — Jeremaiah C Hallenbeck-Huber
*Assistant Examiner* — Susan E Hodges
(74) *Attorney, Agent, or Firm* — Nields, Lemack & Frame, LLC

(57) ABSTRACT

An image acquiring device comprises a first camera 14 for acquiring video images, consisting of frame images continuous in time series, a second camera 15 being in a known relation with the first camera and used for acquiring two or more optical spectral images of an object to be measured, and an image pickup control device 21, and in the image acquiring device, the image pickup control device is configured to extract two or more feature points from one of the frame images, to sequentially specify the feature points in the frame images continuous in time series, to perform image matching between the frame images regarding the frame images corresponding to the two or more optical spectral images based on the feature points, and to synthesize the two or more optical spectral images according to the condition obtained by the image matching.

10 Claims, 14 Drawing Sheets

US 9,544,575 B2
Page 2

(51) Int. Cl.
*G01J 3/28* (2006.01)
*B64C 39/02* (2006.01)
*B64D 47/08* (2006.01)
*G01C 11/06* (2006.01)
*G06T 7/20* (2006.01)
*G01C 11/02* (2006.01)
*G06T 7/00* (2006.01)
*G06K 9/00* (2006.01)

(52) U.S. Cl.
CPC ........ *G01C 11/025* (2013.01); *G06K 9/00208* (2013.01); *G06K 9/6202* (2013.01); *G06T 7/002* (2013.01); *G06T 7/204* (2013.01); *G06T 7/2086* (2013.01); *H04N 13/025* (2013.01); *H04N 13/0221* (2013.01); *H04N 13/0296* (2013.01); *B64C 2201/024* (2013.01); *B64C 2201/127* (2013.01); *B64C 2201/146* (2013.01)

(56) References Cited

U.S. PATENT DOCUMENTS

| | | | |
|---|---|---|---|
| 4,858,157 A | 8/1989 | Murai et al. | |
| 5,262,856 A | 11/1993 | Lippman et al. | |
| 5,274,453 A | 12/1993 | Maeda | |
| 5,530,420 A | 6/1996 | Tsuchiya et al. | |
| 5,684,887 A | 11/1997 | Lee et al. | |
| 5,790,188 A * | 8/1998 | Sun | 348/144 |
| 6,031,568 A | 2/2000 | Wakitani | |
| 6,038,074 A * | 3/2000 | Kitaguchi et al. | 359/618 |
| 6,385,334 B1 | 5/2002 | Saneyoshi et al. | |
| 6,690,451 B1 | 2/2004 | Schubert | |
| 7,024,340 B2 * | 4/2006 | Nichols et al. | 702/188 |
| 7,050,909 B2 | 5/2006 | Nichols et al. | |
| 7,127,348 B2 * | 10/2006 | Smitherman et al. | 701/409 |
| 7,149,366 B1 | 12/2006 | Sun | |
| 7,242,817 B2 | 7/2007 | Takeda et al. | |
| 7,298,869 B1 * | 11/2007 | Abernathy | 382/108 |
| 7,612,822 B2 * | 11/2009 | Ajito | H04N 9/045 |
| | | | 348/262 |
| 7,720,577 B2 * | 5/2010 | Cheng et al. | 701/2 |
| 7,772,539 B2 * | 8/2010 | Kumar | 250/211 |
| 7,804,996 B2 | 9/2010 | Ohtomo et al. | |
| 7,995,799 B2 * | 8/2011 | Schultz et al. | 382/106 |
| 2002/0001406 A1 | 1/2002 | Kochi et al. | |
| 2002/0180636 A1 | 12/2002 | Lin et al. | |
| 2002/0180870 A1 | 12/2002 | Chen | |
| 2002/0191837 A1 | 12/2002 | Takeda et al. | |
| 2004/0105493 A1 | 6/2004 | Kondo et al. | |
| 2004/0105579 A1 | 6/2004 | Ishii et al. | |
| 2004/0125984 A1 | 7/2004 | Ito et al. | |
| 2005/0286048 A1 | 12/2005 | Kitagawa | |
| 2007/0064119 A1 | 3/2007 | Komiya et al. | |
| 2009/0196491 A1 * | 8/2009 | Stainlay et al. | 382/154 |
| 2011/0285995 A1 * | 11/2011 | Tkaczyk | G01J 3/02 |
| | | | 356/326 |
| 2012/0007979 A1 * | 1/2012 | Schneider | G01J 3/36 |
| | | | 348/116 |
| 2016/0227197 A1 | 8/2016 | Ohtomo et al. | |

FOREIGN PATENT DOCUMENTS

| | | |
|---|---|---|
| CN | 101881726 A | 11/2010 |
| CN | 101937079 A | 1/2011 |
| CN | 101976429 A | 2/2011 |
| CN | 102012528 A | 4/2011 |
| EP | 1139062 A2 | 10/2001 |
| EP | 1158309 A2 | 11/2001 |
| EP | 1378790 A2 | 1/2004 |
| JP | 2001-296180 A | 10/2001 |
| JP | 2005-341175 A | 12/2005 |
| JP | 2006-10376 A | 1/2006 |
| JP | 2006-10944 A | 1/2006 |
| JP | 2011-89895 A | 5/2011 |
| WO | 02/082181 A1 | 10/2002 |
| WO | 2004/004320 A1 | 1/2004 |
| WO | 2004/084136 A2 | 9/2004 |

* cited by examiner

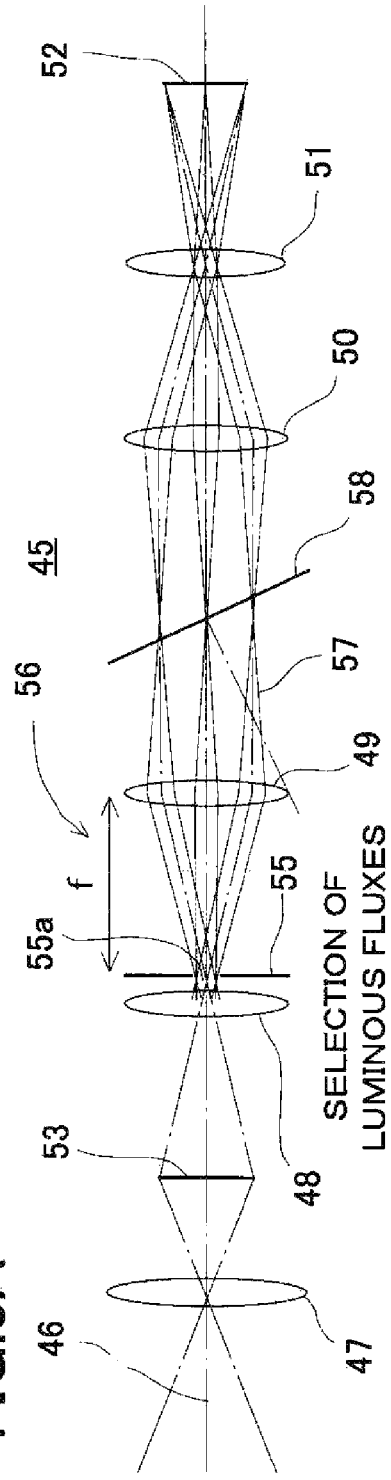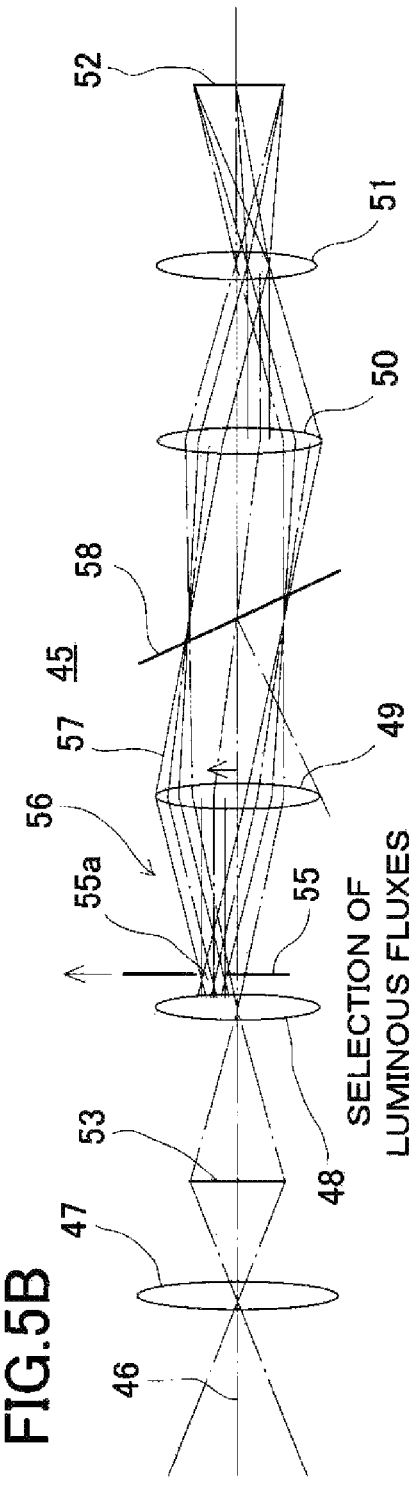

SELECTION OF
LUMINOUS FLUXES

SELECTION OF
LUMINOUS FLUXES

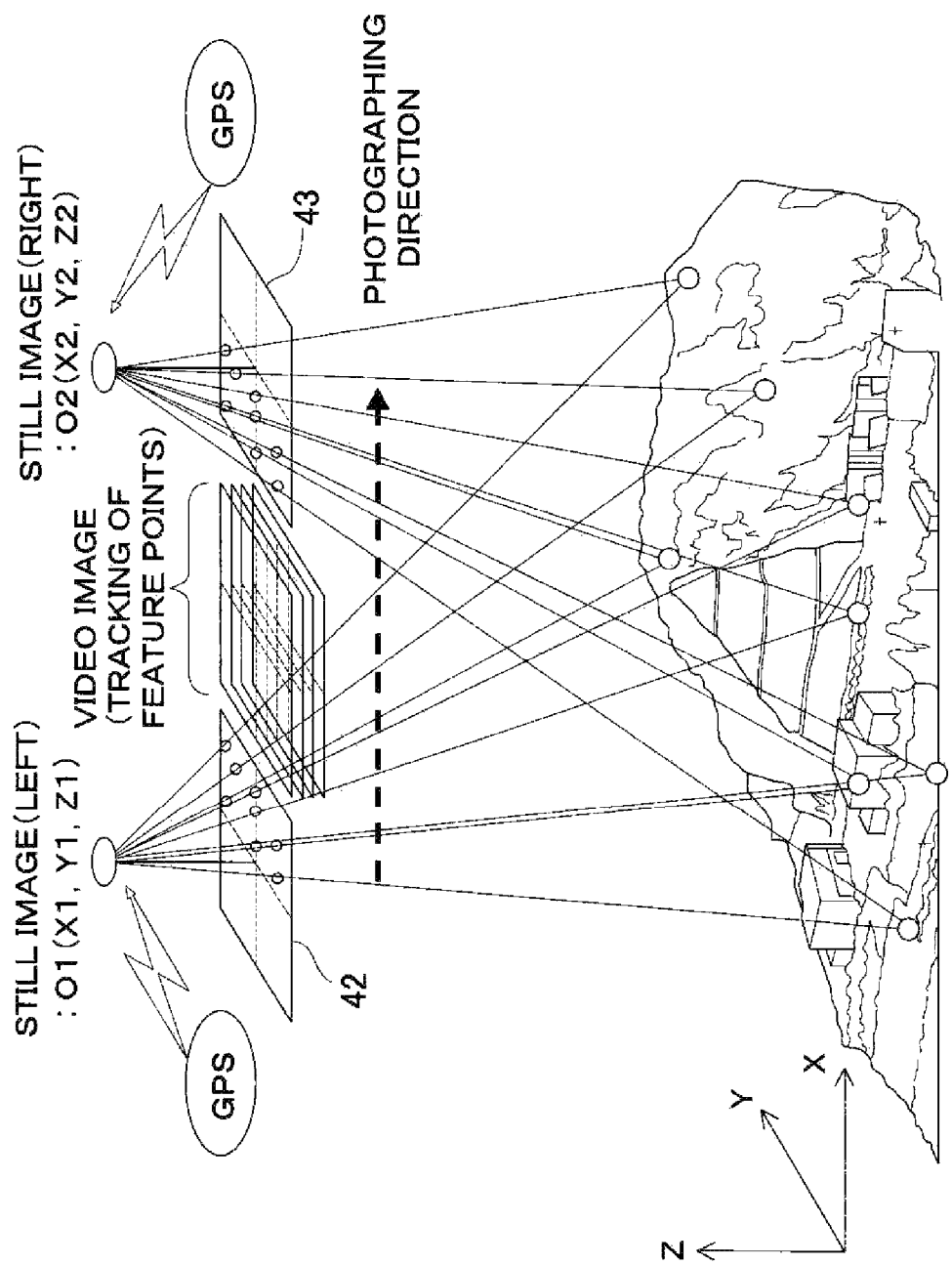

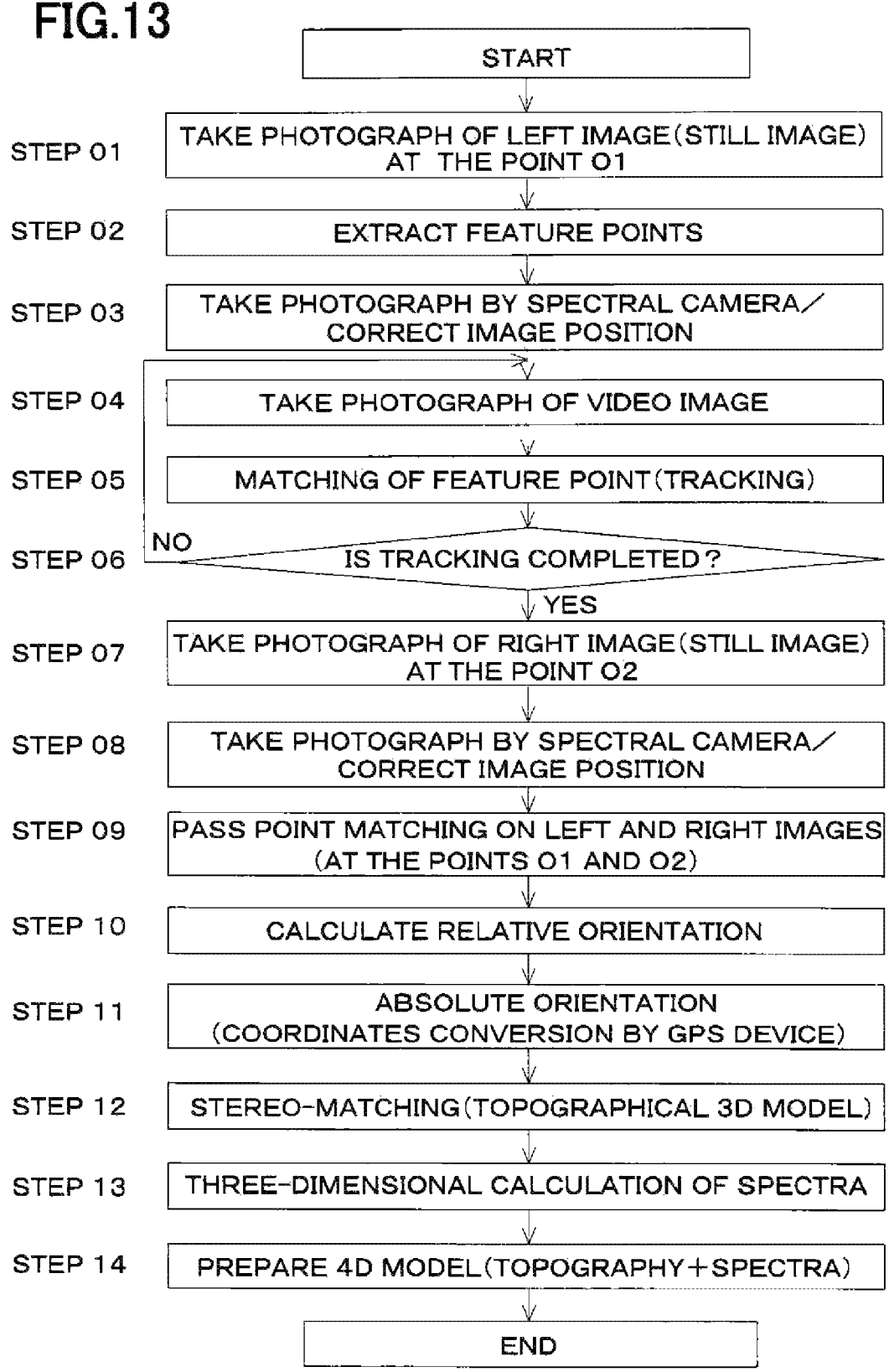

IMAGE ACQUIRING DEVICE AND IMAGE ACQUIRING SYSTEM

BACKGROUND OF THE INVENTION

The present invention relates to an image acquiring device and an image acquiring system to obtain an image of an object to be measured and three dimensional data of the object to be measured, and also to acquire optical spectral characteristics for matching the three-dimensional data.

In the past, it has been practiced to obtain an image of an object to be measured at the same time as the acquisition of the three-dimensional data of the object to be measured by carrying out digital photogrammetry etc. of the object to be measured and to acquire three-dimensional data with the images.

The three-dimensional data with images as obtained in the conventional type three-dimensional measuring device can be used in map data or the like, and these data have the effects to increase visibility or other effects.

On the other hand, the data thus obtained are three-dimensional positional data of the object to be measured, and information obtained offers three-dimensional position of the object to be measured.

When measurement is performed on the object to be measured, it is desirable that more information can be obtained, and it is desirable that—not only positional information of the object to be measured but also information on properties of the object to be measured can be acquired.

For instance, if information can be obtained on growing conditions of an agricultural product, it will contribute to increase the possibility to make adequate decision and to take proper action on agricultural work. Or, if it would be possible to make definite judgment on the type of mineral substance, which is exposed to ground surface or the like, it will be helpful for making an adequate selection of civil engineering method or for other purpose.

SUMMARY OF THE INVENTION

It is an object of the present invention to provide an image acquiring device and an image acquiring system, by which it is possible to obtain optical spectral images at higher accuracy by using a spectral camera to identify varying conditions, and by which it is possible to acquire three-dimensional data including data on optical spectral characteristics.

To attain the above object, an image acquiring device according to the present invention comprises a first camera for acquiring video images, consisting of frame images continuous in time series, a second camera being in a known relation with the first camera and used for acquiring two or more optical spectral images of an object to be measured, and an image pickup control device, and in the image acquiring device, the image pickup control device is configured to extract two or more feature points from one of the frame images, to sequentially specify the feature points in the frame images continuous in time series, to perform image matching between the frame images regarding the frame images corresponding to the two or more optical spectral images based on the feature points, and to synthesize the two or more optical spectral images according to the condition obtained by the image matching.

Further, in the image acquiring device according to the present invention, the image pickup control device acquires the frame images and the optical spectral images synchronously, and performs relative positioning of each of the optical spectral images based on a position of the feature point on each frame image.

Further, in the image acquiring device according to the present invention, the image pickup control device extracts at least five feature points from a first frame images of the video images taken by the first camera, specifies the at least five feature points in n-th frame image by image tracking, performs stereo-matching based on the feature points of both images, and prepares a three-dimensional model of the object to be measured.

Further, in the image acquiring device according to the present invention, the image pickup control device combines information of wavelength components of the synthesized optical spectral images to the three-dimensional model.

Further, in the image acquiring device according to the present invention, the optical spectral images acquired by the second camera are acquired as two-dimensional images relating to a predetermined wavelength range.

Further, an image acquiring system according to the present invention comprises a flying object, a GPS device mounted on the flying object, a control device for controlling flight of the flying object, a first camera mounted on the flying object and for acquiring video images made up by frame images continuous to each other in time series, a second camera provided in a known relation with the first camera and for acquiring an optical spectral image of an object to be measured, and an image pickup control device, and in the image acquiring system, the flying object moves from a first point to a second point, the GPS device measures a position of the first point and a position of the second point in geocentric coordinate system, the first camera acquires a still image of the first point, acquires video images during the moving from the first point to the second point, and further, acquires still images at the second point, the second camera acquires two or more optical spectral image in a predetermined wavelength range, the image pickup control device extracts two or more feature points from the still image at the first point, performs video image tracking from the video image during the moving from the first point to the second point, specifies the feature points in the still image at the second point, performs stereo-matching of the still image at the first point with the still image at the second point based on the feature points, prepares a three-dimensional model based on positions of the first point and the second point in the geocentric coordinate system, and the image pickup control device synthesizes two or more optical spectral images, prepares an optical spectral synthetic image, synthesizes the three-dimensional model with the optical spectral synthetic image, and prepares a four-dimensional model having three-dimensional position data and optical spectral information of the object to be measured.

Further, in the image acquiring system according to the present invention, the second camera acquires two or more optical spectral images in a predetermined wavelength range during the hovering flight at the first point and acquires two or more optical spectral images in the predetermined wavelength range during the hovering flight at the second point, the image pickup control device synthesizes two or more optical spectral images of the first point, prepares a first optical spectral synthetic image, synthesizes two or more optical spectral images of the second point, prepares a second optical spectral synthetic image, synthesizes the three-dimensional model with at least one of the first optical spectral synthetic image and the second optical spectral synthetic image, and prepares a four-dimensional model having three-dimensional positional data and optical spectral information of the object to be measured.

Further, in the image acquiring system according to the present invention, the first camera acquires a same position video image in the hovering flight, the image pickup control device performs synchronization on frame image of the same position video image, acquires an optical spectral image by the second camera, performs image tracking between frame images, performs image matching of two frame images corresponding to two optical spectral images continuous in terms of time, synthesizes the two optical spectral images under the condition obtained by the image matching, sequentially repeats the image matching of the frame images and synthesizing of the optical spectral images, and synthesizes all optical spectral images acquired during the hovering flight.

Further, in the image acquiring system according to the present invention, the second camera acquires two or more optical spectral images in a predetermined wavelength range during the moving from the first point to the second point.

Furthermore, in the image acquiring system according to the present invention, the image pickup control device performs synchronization of the video image with the frame image, acquires an optical spectral image by the second camera, performs image tracking between the frame images, performs image matching of two frame images corresponding to two optical spectral images continuous in terms of time, synthesizes the two optical images under the condition as obtained in the image matching, sequentially repeats the image matching of the frame image and synthesizing of the optical spectral image, and synthesizes all optical spectral images acquired during the course of the moving.

According to the present invention, an image acquiring device comprises a first camera for acquiring video images, consisting of frame images continuous in time series, a second camera being in a known relation with the first camera and used for acquiring two or more optical spectral images of an object to be measured, and an image pickup control device, and in the image acquiring device, the image pickup control device is configured to extract two or more feature points from one of the frame images, to sequentially specify the feature points in the frame images continuous in time series, to perform image matching between the frame images regarding the frame images corresponding to the two or more optical spectral images based on the feature points, and to synthesize the two or more optical spectral images according to the condition obtained by the image matching. As a result, it is possible to make correction in a case where deviation occurs between the optical spectral images, and to acquire an optical spectral synthetic image and a hyperspectral image with higher accuracy.

Further, according to the present invention, in the image acquiring device, the image pickup control device acquires the frame images and the optical spectral images synchronously, and performs relative positioning of each of the optical spectral images based on a position of the feature point on each frame image. As a result, it is possible to make correction in a case where deviation occurs between the optical spectral images and to synthesize optical spectral images with higher accuracy.

Further, according to the present invention, in the image acquiring device, the image pickup control device extracts at least five feature points from a first frame images of the video images taken by the first camera, specifies the at least five feature points in n-th frame image by image tracking, performs stereo-matching based on the feature points of both images, and prepares a three-dimensional model of the object to be measured. As a result, it will be easier to specify the feature points in an n-th frame image, and stereo-matching can be performed in easier manner.

Further, according to the present invention, in the image acquiring device, the image pickup control device combines information of wavelength components of the synthesized optical spectral images to the three-dimensional model. As a result, it is possible to acquire a four-dimensional image including optical spectral information in addition to the three-dimensional position information.

Further, according to the present invention, an image acquiring system comprises a flying object, a GPS device mounted on the flying object, a control device for controlling flight of the flying object, a first camera mounted on the flying object and for acquiring video images made up by frame images continuous to each other in time series, a second camera provided in a known relation with the first camera and for acquiring an optical spectral image of an object to be measured, and an image pickup control device, and in the image acquiring system, the flying object moves from a first point to a second point, the GPS device measures a position of the first point and a position of the second point in geocentric coordinate system, the first camera acquires a still image of the first point, acquires video images during the moving from the first point to the second point, and further, acquires still images at the second point, the second camera acquires two or more optical spectral image in a predetermined wavelength range, the image pickup control device extracts two or more feature points from the still image at the first point, performs video image tracking from the video image during the moving from the first point to the second point, specifies the feature points in the still image at the second point, performs stereo-matching of the still image at the first point with the still image at the second point based on the feature points, prepares a three-dimensional model based on positions of the first point and the second point in the geocentric coordinate system, and the image pickup control device synthesizes two or more optical spectral images, prepares an optical spectral synthetic image, synthesizes the three-dimensional model with the optical spectral synthetic image, and prepares a four-dimensional model having three-dimensional position data and optical spectral information of the object to be measured. As a result, it is possible to acquire a four-dimensional model as seen from high up in the sky easily, and to acquire three-dimensional position data at an arbitrary point of the object to be measured and optical spectral information easily.

Further, according to the present invention, in the image acquiring system, the second camera acquires two or more optical spectral images in a predetermined wavelength range during the hovering flight at the first point and acquires two or more optical spectral images in the predetermined wavelength range during the hovering flight at the second point, the image pickup control device synthesizes two or more optical spectral images of the first point, prepares a first optical spectral synthetic image, synthesizes two or more optical spectral images of the second point, prepares a second optical spectral synthetic image, synthesizes the three-dimensional model with at least one of the first optical spectral synthetic image and the second optical spectral synthetic image, and prepares a four-dimensional model having three-dimensional positional data and optical spectral information of the object to be measured. As a result, it is possible to acquire a four-dimensional model as seen from high up in the sky easily, and to acquire three-dimensional position data at an arbitrary point of the object to be measured and optical spectral information easily.

Further, according to the present invention, in the image acquiring system, the first camera acquires a same position video image in the hovering flight, the image pickup control device performs synchronization on frame image of the same position video image, acquires an optical spectral image by the second camera, performs image tracking between frame images, performs image matching of two frame images corresponding to two optical spectral images continuous in terms of time, synthesizes the two optical spectral images under the condition obtained by the image matching, sequentially repeats the image matching of the frame images and synthesizing of the optical spectral images, and synthesizes all optical spectral images acquired during the hovering flight. As a result, even when deviation occurs between two or more optical spectral images acquired under the condition where the flying object is not completely in hovering state, it is possible to perform positioning or matching between the optical spectral images via image matching of the frame image, and to prepare an optical spectral synthetic image with higher accuracy.

Further, according to the present invention, in the image acquiring system, the second camera acquires two or more optical spectral images in a predetermined wavelength range during the moving from the first point to the second point. As a result, it is possible to acquire a four-dimensional model as seen from high up in the sky easily, and to acquire three-dimensional position data at an arbitrary point of the object to be measured and optical spectral information easily.

Furthermore, according to the present invention, in the image acquiring system, the image pickup control device performs synchronization of the video image with the frame image, acquires an optical spectral image by the second camera, performs image tracking between the frame images, performs image matching of two frame images corresponding to two optical spectral images continuous in terms of time, synthesizes the two optical images under the condition as obtained in the image matching, sequentially repeats the image matching of the frame image and synthesizing of the optical spectral image, and synthesizes all optical spectral images acquired during the course of the moving. As a result, regarding two or more optical spectral images acquired by the flying object during the moving, it is possible to perform positioning or matching between the optical spectral images via image matching of the frame image, and to prepare an optical spectral synthetic image with high accuracy.

BRIEF DESCRIPTION OF THE DRAWINGS

FIG. 5A and FIG. 5B each represents an explanatory drawing to show an optical system of a spectral camera having a transmission type interference filter to be used in an embodiment of the present invention. FIG. 5A shows a condition where diaphragm orifice concurs with an optical axis, and FIG. 5B shows a condition where the diagram orifice is separated from the optical axis;

FIG. 6 is a graph to show a relation between an incident angle and a peak wavelength of a light, which passes through;

FIG. 8A shows a condition where a diaphragm orifice concurs with the optical axis and FIG. 8B shows a condition where the diaphragm orifice is separated from the optical axis;

FIG. 9A shows a condition where a diaphragm orifice concurs with the optical axis and FIG. 9B shows a condition where the diaphragm orifice is separated from the optical axis;

FIG. 11 is an explanatory drawing to show a condition to acquire a hyper-spectral image in the present embodiment;

FIG. 13 is a flow chart to show operation in an embodiment of the present invention;

DETAILED DESCRIPTION OF THE PREFERRED EMBODIMENTS

Description will be given below on embodiments of the present invention by referring to the attached drawings.

An image acquiring device of an embodiment of the present invention is mounted on a small Unmanned Aerial Vehicle (UAV), e.g. a small type helicopter which can be operated by remote control operation or can fly autonomously.

Figure 1:
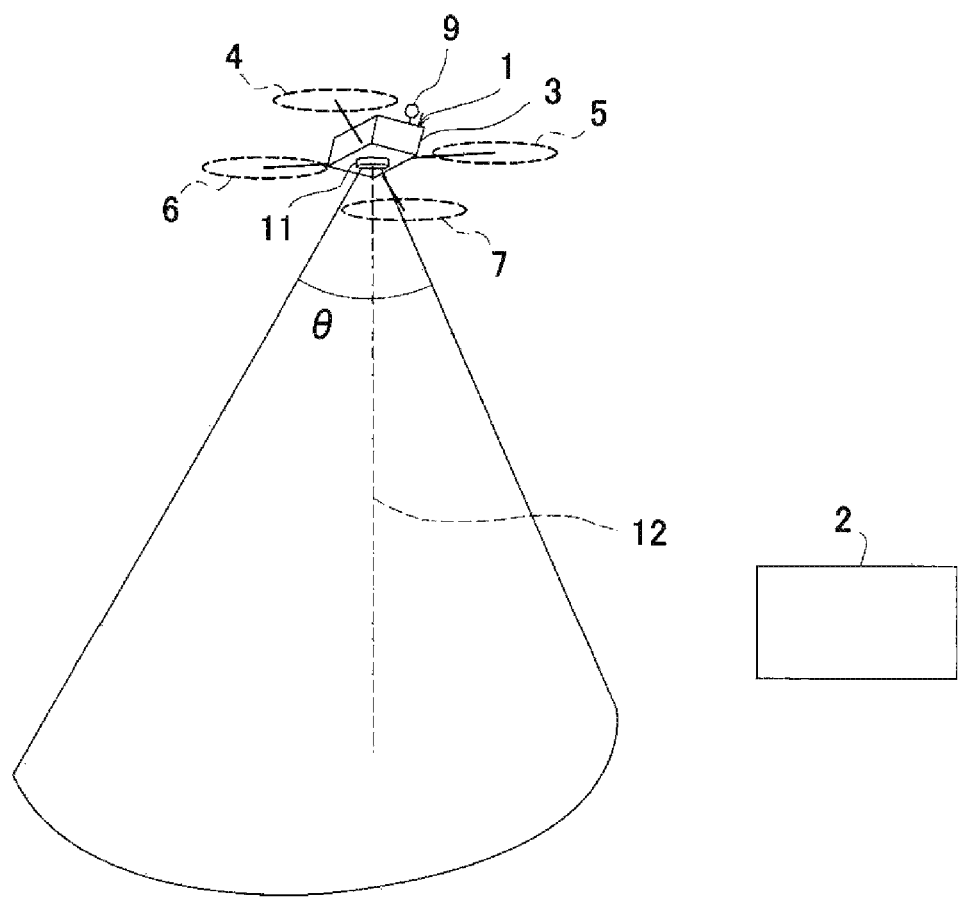
FIG. 1 is a schematical drawing to show a small flying object, on which an image pickup device according to the present invention is mounted.

FIG. 1 shows a small flying object 1 where an image acquiring device according to the present embodiment is mounted.

In FIG. 1, reference numeral 2 represents a base station control device to be installed on ground surface. The base station control device 2 can perform data communication to and from a flying object 1 and the base station control device 2 controls flight of the flying object 1, sets and changes flight plan, and stores and manages information collected by the flying object 1.

The flying object 1 is a helicopter used as a small type flying object which flies autonomously. This helicopter 1 is operated by remote control from the base station control device 2. Or, the flight plan is set up on a control device (not shown) of the helicopter 1 from the base station control device 2, and the control device controls navigation means (to be described later) and autonomous flight is performed according to the flight plan. The control device controls the navigation means and controls the helicopter 1 at a predetermined speed and at a predetermined altitude, and also can control the helicopter 1 in hovering state (stationary flying condition) at a certain predetermined position.

The helicopter 1 has a helicopter body 3, and as many propellers as required mounted on the helicopter body 3 (e.g. four sets of propellers 4, 5, 6 and 7, each being mounted at front, rear, left and right positions respectively). Each of the propellers 4, 5, 6 and 7 is individually coupled with a motor (not shown), and each of the motors is designed to be controlled independently. The propellers 4, 5, 6 and 7 and the motors or the like make up together the navigation means of the helicopter 1.

On the helicopter body 3, a GPS device 9 for measuring a reference position of the helicopter 1 is mounted.

On the helicopter body 3 of the helicopter 1, an image pickup device 11 is provided on board. The image pickup device 11 has an optical axis 12, and the optical axis 12 is designed to be extended in downward direction so that the image pickup device 11 takes image of positions in downward direction of the helicopter 1.

Next, referring to FIG. 2, description will be given on approximate arrangement of the image pickup device 11.

The image pickup device 11 has a camera unit 13 and an image pickup control device 21. The image pickup control device 21 can perform digital photogrammetry of an object to be measured based on image data as acquired by the camera unit 13 and based on position information from the GPS device 9 and performs processing such as synthesizing of optical spectral data acquired by the camera unit 13 with the image data or other types of processing.

First, description will be given on the camera unit 13.

The camera unit 13 comprises an image camera 14 used as a first camera and a spectral camera 15 used as second camera. The optical axis 12 is divided by a half-mirror 16. The image camera 14 is provided on one optical axis 12*a*, and the spectral camera 15 is provided on the other optical axis 12*b*. The image camera 14 acquires an image as it is (real image) of an object to be measured, and the spectral camera 15 acquires an optical spectral image.

As described above, the image camera 14 and the spectral camera 15 have the optical axis 12 in common, and the image camera 14 and the spectral camera 15 are in a known relation. Or, the image camera 14 and the spectral camera 15 may be separately provided. Also, the optical axis of the image camera 14 and the optical axis of the spectral camera 15 are set in parallel to each other. A distance between the optical axes is already known, and the image camera 14 and the spectral camera 15 are set in a known relation to each other.

The image camera 14 takes images at the points to be measured and outputs digital image data. The image camera 14 may be a camera to take a still image at a predetermined time interval or may be a video camera to continuously take images.

The image camera 14 has a CCD or CMOS sensor, which is an aggregate of pixels, as an image pickup element 14*a*, and a relation between the optical axis 12*a* and the image pickup element 14*a* is set in such a manner that the optical axis 12*a* passes perpendicularly the center (i.e. the center of coordinates of a photodetection surface) of the image pickup element 14*a*. Therefore, it is so designed that each pixel of the image pickup element 14*a* can specify the position on the image pickup element 14*a*, and further that a field angle of each pixel (i.e. an angle with respect to the optical axis 12) can be identified.

The spectral camera 15 has a CCD or CMOS sensor, which is an aggregate of pixels, as an image pickup element 15*a*, similarly to the case of the image camera 14, and a relation between the optical axis 12*b* and the image pickup element 15*a* is set in such a manner that the optical axis 12*b* passes perpendicularly the center of the image pickup element 15*a* (i.e. the center of coordinates of photodetection surface). Therefore, each pixel of the image pickup element 15*a* can identify a position (coordinate) on the image pickup element 15*a* and a field angle of each pixel (i.e. an angle with respect to the optical axis 12) can be identified. Further, each pixel of the image pickup element 15*a* and each pixel of the image pickup element 14*a* match in a one-to-one relation.

Now, description will be given on an image pickup control device 21.

The image pickup control device 21 comprises an arithmetic control unit (CPU) 22, an image data recording unit 23, an image controller 24, a camera control unit 25, a spectral camera controller 26, a spectral data storage unit 27, an image synthesizing unit 28, an image processing unit 29, a characteristics extracting unit 31, a matching unit 32, a measuring unit 33, a model image preparing unit 34, a display unit 35, and a storage unit 36.

The camera control unit 25 controls the image camera 14 and the spectral camera 15 synchronously. The image controller 24 drives the image camera 14 based on an instruction signal from the camera control unit 25 and takes image data (real image data). The image data thus acquired are associated with image pickup time and are stored in the image data recording unit 23.

The spectral camera controller 26 drives the spectral camera 15 according to an instruction from the camera control unit 25 and acquires optical spectral image data. The optical spectral image data are associated with time and are stored in the spectral data storage unit 27.

The image synthesizing unit 28 synthesizes image data stored in the image data recording unit 23 with the optical spectral image data stored in the spectral data storage unit 27, thereby synthesizing a hyper-spectral image in such a manner that all pixels of one image have optical spectral information.

The image processing unit 29 has the characteristics extracting unit 31 and the matching unit 32, and at least five or more feature points (pass points) can be extracted from image data of one frame. Then, tracking of image or matching of image is performed according to the feature points on the image data different in terms of time or according to the image data acquired from different image pickup points.

For the image tracking and the image matching, SSDA method (sequential similarity detection algorithm), the normalized cross-correlation method, the least square matching method, etc. are used.

The measuring unit 33 fulfills the functions to execute digital photogrammetry based on two image data acquired by the image camera 14 from different image pickup positions.

The model image preparing unit 34 is used to associate distance data of each pixel measured by the measuring unit 33 with the hyper-spectral image, and to prepare a model image, which has four-dimensional data, i.e. two-dimensional position data (plane coordinates data)+optical spectral data+height data.

In the storage unit 36, various types of programs are stored. These programs include: a program needed for camera control, a program needed for synthesis of image data and optical spectral image data, a program needed for image processing, a program needed for measurement, a program needed for preparation of model image, a program for controlling the display unit 35, etc. The image data recording unit 23 and the spectral data storage unit 27 may be prepared in a part of the storage unit 36.

Next, referring to FIG. 3 and FIG. 4, description will be given on distance measurement by digital photogrammetry.

Figure 3:
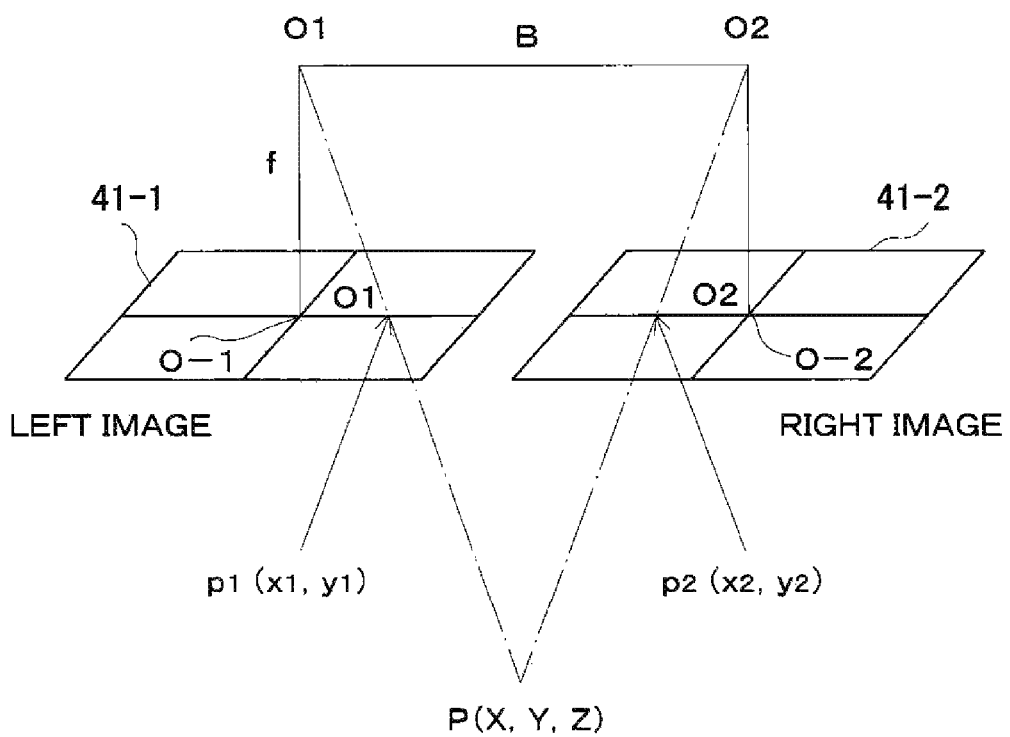
FIG. 3 is an explanatory drawing to show a principle of digital photogrammetry for measuring altitude of a flying object and coordinates of a measuring point from the images, which the flying object has taken from two points.
Figure 4:
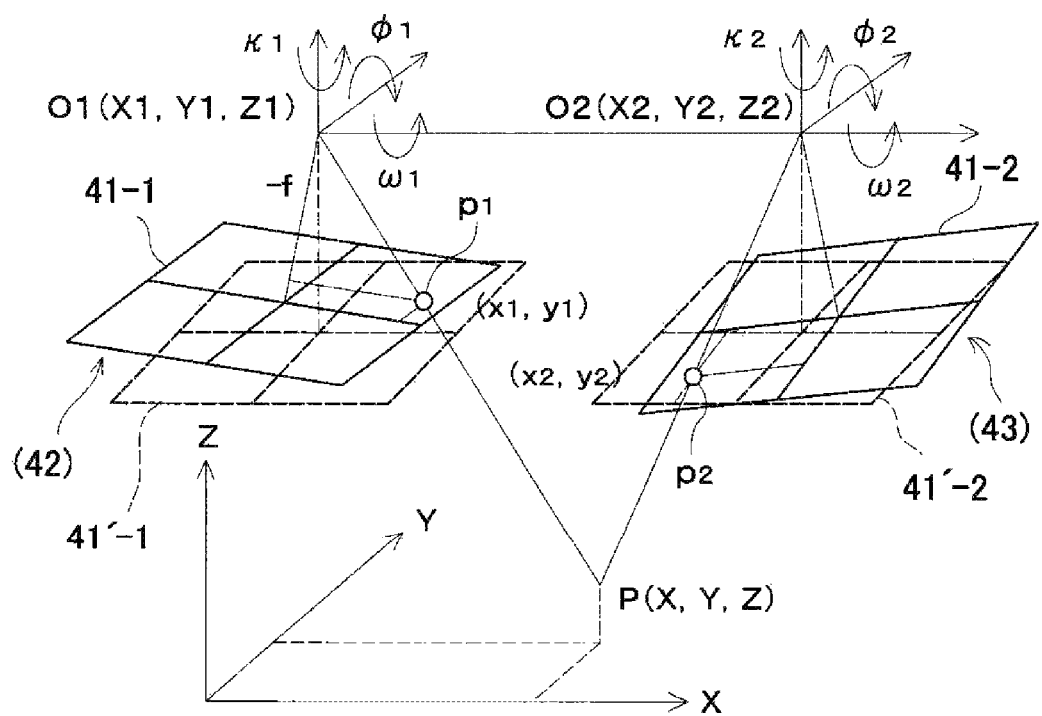
FIG. 4 is an explanatory drawing on relative orientation in the digital photogrammetry in a case where the camera is tilted.

It is supposed here that in FIG. 3, the helicopter 1 flies from a point O1 to a point O2, and that the images are taken at the point O1 and at the point O2. A distance B from the point O1 to the point O2 is a photographing base length. A numeral 41-1 and a numeral 41-2 each represents an image pickup element 41 of the image pickup device 11 at the point O1 and the point O2 respectively, and the image pickup element 41-1 and 41-2 are equivalent to the image data. FIG. 3 shows a case that the optical axis 12 of the image pickup device 11 runs in vertical direction, i.e. a case where the helicopter 1 is in horizontal posture.

A position of a measuring point P on the image as taken at the point O1 (i.e. a position on the image pickup element) will be p1 (x1, y1), and a position of the measuring point P on the image as taken at the point O2 (i.e. a position on the image pickup element) will be p2 (x2, y2). Focal length f of the image pickup device 11 and a distance Z from the photographing base length B to the point P, (height distance of the helicopter 1), is determined from relation of similarity of a triangle (O1, O2 and P), a triangle (O1, p1) and a triangle (O2, p2) as:

$$Z = -Bf/(x1+x2)$$

Here, ground surface coordinates of the point O1 and the point O2 can be measured by the GPS device 9. The photographing base length B is a distance between two points, i.e. a distance between the point O1 and the point O2, and the photographing base length B can be obtained based on the result of measurement by the GPS device 9. Also, geocentric positions (plane coordinates) of the measuring point P can be determined similarly from p1 (x1, y1) and p2 (x2, y2) and from the geocentric positions of the point O1 and the point O2 as measured by the GPS device 9.

Therefore, from two images sequentially taken in the process of the moving of the helicopter 1, an altitude of the helicopter 1 (i.e. an altitude from the ground surface) can be determined at real time (measurement of an altitude distance).

In the digital photogrammetry as described above, p1 (x1, y1) and p2 (x2, y2) correspond to a point common to a left image 42 taken at the point O1 and a right image 43 taken at the point O2, and P1 and P2 are called as pass points.

The point p1 in the left image 42 can be obtained as a feature point by image processing such as edge processing or other processing on the left image 42 acquired at the point O1. In FIG. 4, only one point is shown. Actually, however, a multiple of points are extracted as the feature points.

A procedure to specify the point p2, which corresponds to the point p1, in the right image 43 is performed by a process called video image tracking. The video images are made up by frame images, which are continuous in time series.

In the video image tracking, the video images (frame images) are continuously acquired from the point O1 to the point O2, and a preset range including the point p1 in one frame image is set up in a searching range. In the searching range within the next frame images, which are adjacent to each other in terms of time, a point to correspond to the point p1 is searched, and further, the point is specified. The searching within the preset range with respect to the next frame image and the specifying are repeatedly performed, and the point p2 is finally specified in the right image 43.

The video image tracking is described in the Japanese Patent Application Publication JP-A-2006-10376.

The helicopter 1 is controlled at horizontal position by a flight control unit (not shown), but the horizontal posture may be disturbed under the influence of various causes such as wind. For this reason, the posture of the image pickup device 11 at the point O1 may be different from the posture of the image pickup device 11 at the point O2. FIG. 4 is a schematical drawing to show condition of an image pickup element 41-1 as taken at the point O1 and tilting condition of an image pickup element 41-2 as taken at the point O2. The left image 42 obtained by the image pickup element 41-1 and the right image 43 taken by the image pickup element 41-2 are also in similar conditions.

Using a vertical axis (Z-axis) of the optical axis 12 as reference, the tilting of the image is represented by a rotation angle κ around Z-axis as the center, by a rotation angle ω around a first horizontal axis (X-axis) as the center, and by a rotation angle φ around a second horizontal axis (Y-axis) as the center. By relative orientation on the image taken at the point O1 and an image taken at the point O2 and by using κ, ω, and φ as variables, the condition can be converted to a condition as shown by broken line in the figure (i.e. a condition shown in FIG. 3). By performing the relative orientation, three-dimensional coordinates of the measuring point P can be calculated. Further, altitudes of the helicopter 1 at the point O1 and at the point O2 can be determined.

Here, rotation angle of each of three axes at the point O1 and the point O2 can be measured by a gyro unit (not shown), and coordinates (x1, y1) of the point p1 in the image at the point O1 and coordinates (x2, y2) of the point p2 in the image at the point O2 can be measured from the positions of pixels of the image pickup element 41. Accordingly, it is assumed here that the coordinates of p1 in a converted coordinate system (model coordinates) after the relative orientation are (X1, Y1, Z1), and the coordinates of p2 in the converted coordinate system (model coordinates) after the relative orientation are (X2, Y2, Z2), and also, that focal length of the image pickup device 11 is f.

Then, the coordinates of p1 and p2 in the converted coordinate system (model coordinates) can be represented as given below:

$X1 = x1 \cos\phi1 \cdot \cos\kappa1 - y1 \cos\phi1 \cdot \sin\kappa1 - f\sin\phi1$ $Y1 = x1 \sin\kappa1 - y1 \cos\kappa1$ $Z1 = -x1 \sin\phi1 \cdot \cos\kappa1 - y1 \sin\phi1 \cdot \sin\kappa1 - f\cos\phi1$ $X2 = x2 \cos\phi2 \cdot \cos\kappa2 - y2 \cos\phi2 \cdot \sin\kappa2 - f\sin\phi1$ $Y2 = x2(\cos\omega2 \sin\kappa2 + \sin\omega2 \cdot \sin\phi2 \cos\kappa2) + y2(\cos\omega2 \cos\kappa2 - \sin\omega2 \cdot \sin\theta2 \cdot \sin\kappa2) + f\sin\phi2 \cdot \cos\theta2$ $Z2 = x2(\sin\omega2 \cdot \sin\kappa2 - \cos\omega2 \cdot \sin\phi2 \cdot \cos\kappa2) + y2(\sin\omega2 \cdot \cos\kappa2 + \cos\omega2 \cdot \sin\phi2 \cdot \sin\kappa2) - f\cos\omega2 \cdot \cos\phi2$ Therefore, three-dimensional coordinates of the measuring point P can be calculated in the same manner as shown in FIG. 3 based on the coordinates (X1, Y1, Z1) of p1 and on the coordinates of p2 (X2, Y2, Z2) (absolute orientation).

Next, description will be given on an example of the spectral camera 15 as used in the present embodiment by referring to FIG. 5A and FIG. 5B.

FIG. 5A and FIG. 5B each represents an optical system 45 of the spectral camera 15.

In each of FIG. 5A and FIG. 5B, reference numeral 46 represents an optical axis of the optical system 45, and an objective lens 47, a first relay lens 48, a second relay lens 49, a third relay lens 50, an image forming lens 51, and an image pickup element 52 are arranged along the optical axis 46. Also, in FIG. 5A and in FIG. 5B, reference numeral 53 represents an image formed by the object lens 47 and a reference symbol f represents a focal length of the second relay lens 49. The objective lens 47 and the first relay lens 48 schematically show a first optical system, and the second relay lens 49 schematically shows a second optical system.

A diaphragm 55, acting as a luminous flux selecting member, is disposed on the side (closer to the second relay lens 49) of the first relay lens 48. The diaphragm 55 has a slit-like diaphragm orifice 55a, which is extended in a direction perpendicular to paper surface in the figure. The diaphragm 55 is disposed at a focal position of the second relay lens 49 closer to object side or nearly at its focal position, and the diaphragm 55 is supported in such a manner that the diaphragm 55 is movable along a direction perpendicular to the optical axis 46 (i.e. a direction perpendicularly crossing the diaphragm orifice 55a) and that the position of the diaphragm 55 can be changed by an adequate position displacing means such as a linear motor or the like.

Here, the diaphragm 55 and the second relay lens 49 make up together a tele-centric optical system 56. After passing through the first relay lens 48, luminous fluxes are split by the tele-centric optical system 56 to a multiple of luminous fluxes (a principal ray 57) running in parallel to each other.

An interference filter 58 with a transmission type interference film is provided on a converging position of the principal ray 57 (at an image-forming position or at an approximately image-forming position by the second relay lens 49). The interference filter 58 fulfills the function as a wavelength selecting filter. From light beams with specific wavelength after passing through the interference filter 58, an image is formed on the image pickup element 52 by the third relay lens 50 and the image-forming lens 51. The image thus formed will be a two-dimensional image formed with the specific wavelength.

Figure 6:

The interference filter 58 has such property that wavelength selecting characteristics are changed according to incident angle of the light beam entering the interference filter 58. FIG. 6 shows a relation between an incident angle and the peak wavelength of the light, which passes through (i.e. incident angle dependency of the peak wavelength), and by changing the incident angle, it can be known that the peak wavelength is changing.

As shown in FIG. 5A, the diaphragm orifice 55a of the diaphragm 55 is positioned on the optical axis 46. In this case, the principal ray 57 runs in parallel to the optical axis 46. Next, in a case where the diagram 55 is moved as shown in FIG. 5B—for instance, in a case where the diagram 55 is moved in upward direction as shown in the figure, the principal ray 57 is tilted with respect to the optical axis 46. That is, incident angle with respect to the interference filter 58 is changed. Therefore, by moving the diaphragm 55, the wavelength of the light passing through the interference filter 58 can be changed.

Figure 7:
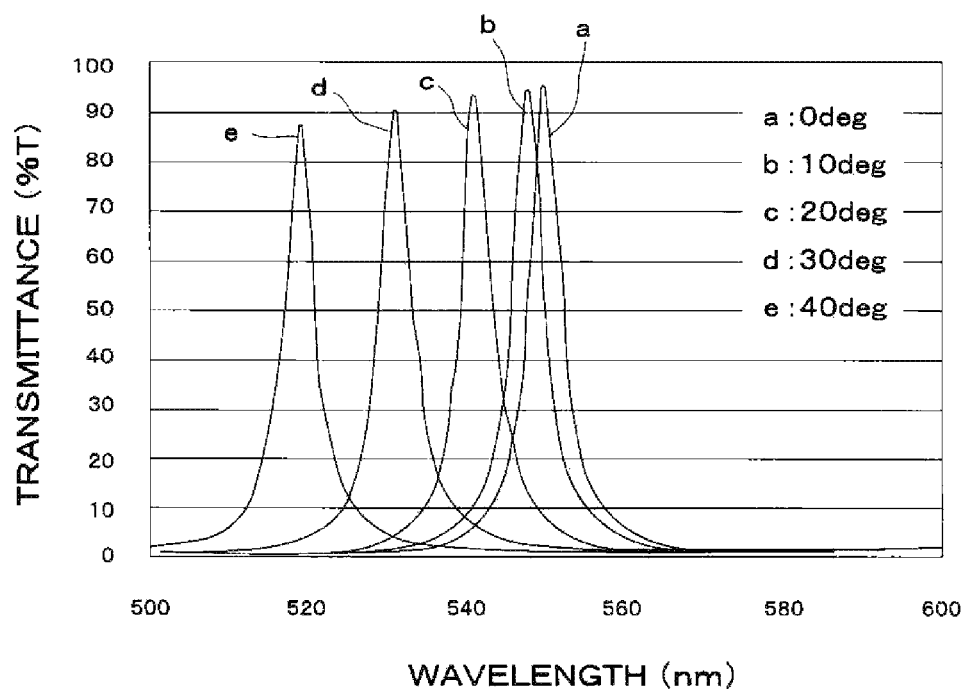
FIG. 7 is a graph to show wavelength transmission characteristics to match an incident angle when the light enters an interference filter.

For instance, referring to FIG. 6, when the incident angle with respect to the interference filter 58 is changed, peak of the wavelength of the light passing is changed in the range of 600 nm to 520 nm. This means that the interference filter 58 has wavelength selection range W of 600 nm to 520 nm. FIG. 7 shows wavelength transmission characteristics to match the incident angle to the interference filter 58.

Next, in FIG. 5A and FIG. 5B, the interference filter 58 is tilted with respect to the optical axis 46. As shown in FIG. 6, incident angle dependency will be linear from a point where the incident angle exceeds 10°. Accordingly, by tilting the interference filter 58 in advance, the change of the selected wavelength with respect to the displacement of the diaphragm 55 can be effectively obtained.

Therefore, by acquiring the image by the image pickup element 52 each time the diaphragm 55 is displaced and by using the interference filter 58 with the wavelength transmission characteristics shown in FIG. 6, light spectrum in the wavelength range of 600 nm to 520 nm can be acquired. When the light spectrum is acquired in the wavelength range exceeding the range of 600 nm to 520 nm, the interference filter 58 can be replaced with an interference filter having a different wavelength selection range W'.

FIG. 7 shows an example of optical spectrum, which is obtained when angle of the interference filter 58 is changed to 0°, 10°, 20°, 30° and 40° respectively.

Figure 8A:
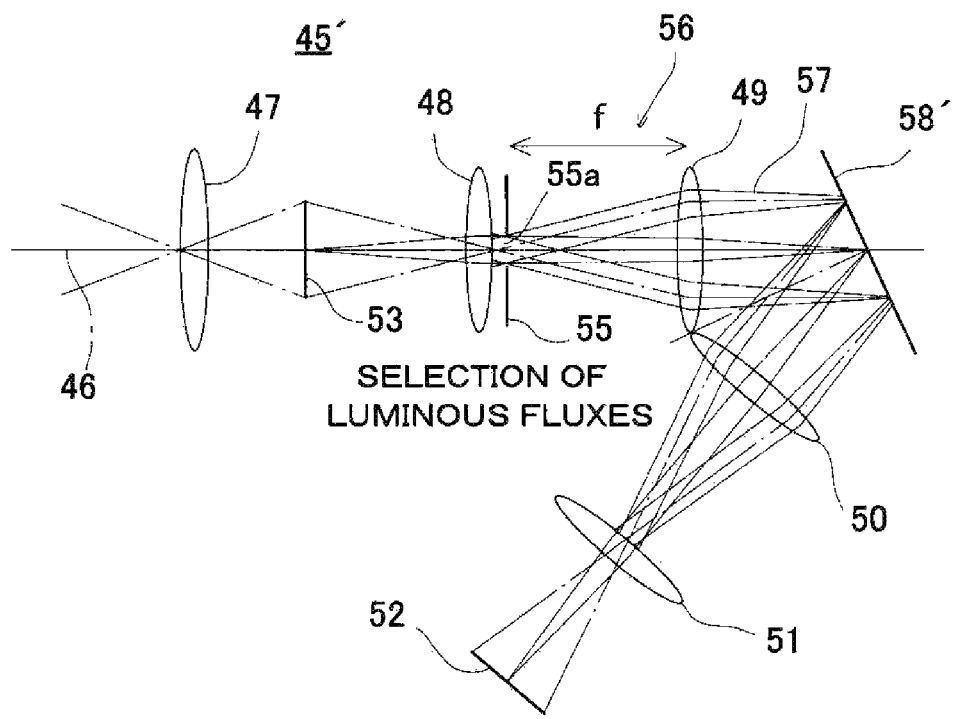
FIG. 8A and FIG. 8B each represents an explanatory drawing to show an optical system having a reflection type interference filter in another spectral camera to be used in the embodiment of the present invention.
Figure 8B:
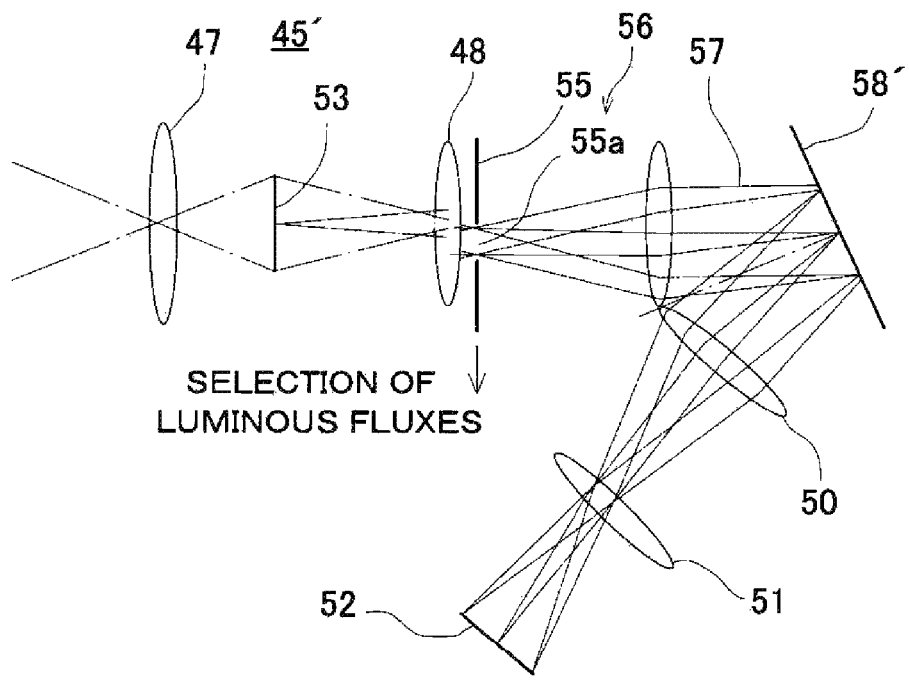

FIG. 8A and FIG. 8B each represents a variation example of an optical system 45 as shown in FIG. 5A and FIG. 5B respectively.

In the optical system 45 shown in FIG. 5A and FIG. 5B, a transmission type interference filter 58 is used. As shown in FIG. 8A and FIG. 8B, an optical system 45' may be arranged by using a reflection type interference filter 58'. The interference filter 58' has a reflection type interference film formed on a reflection mirror. In the optical system 45', wavelength is selected when the light is reflected by the interference filter 58'.

In FIG. 8A and FIG. 8B, the same component as shown in FIG. 5A and FIG. 5B respectively is referred by the same symbol, and detailed description is not given here.

In the variation example as described above, when a diaphragm 55 is moved as shown in FIG. 8B, incident angle of a principal ray 57 to the interference filter 58' is changed, and a light with a specific wavelength in a predetermined wavelength selection range W is selectively reflected.

When a reflection type filter 58' is used as the interference filter, the optical system 45' can be set in a compact arrangement.

Figure 9A:
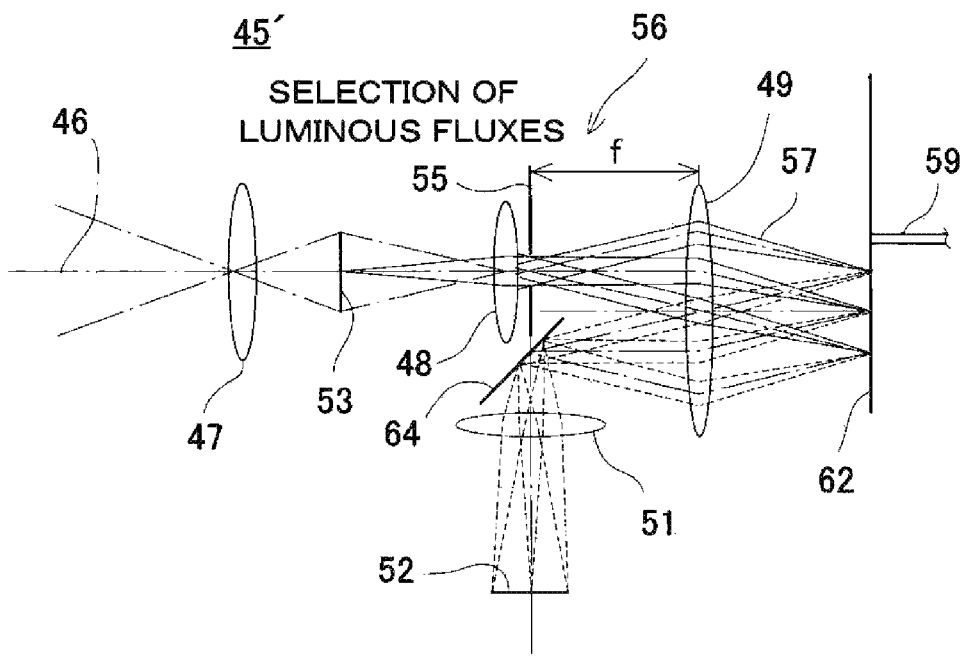
FIG. 9A and FIG. 9B each represents an explanatory drawing to show an optical system having a reflection type interference filter in still another spectral camera to be used in the embodiment of the present invention.
Figure 9B:
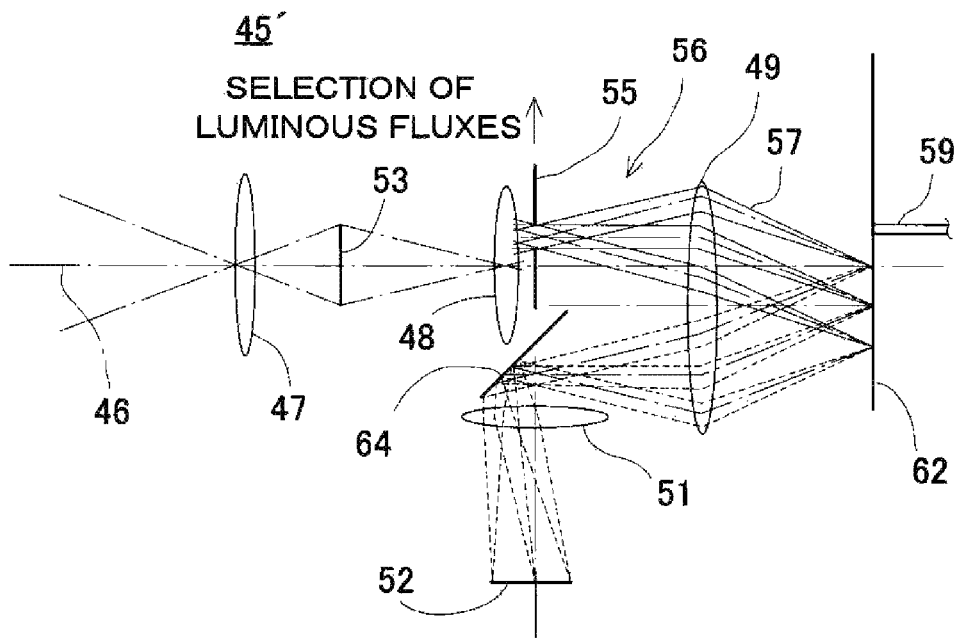
Figure 10:
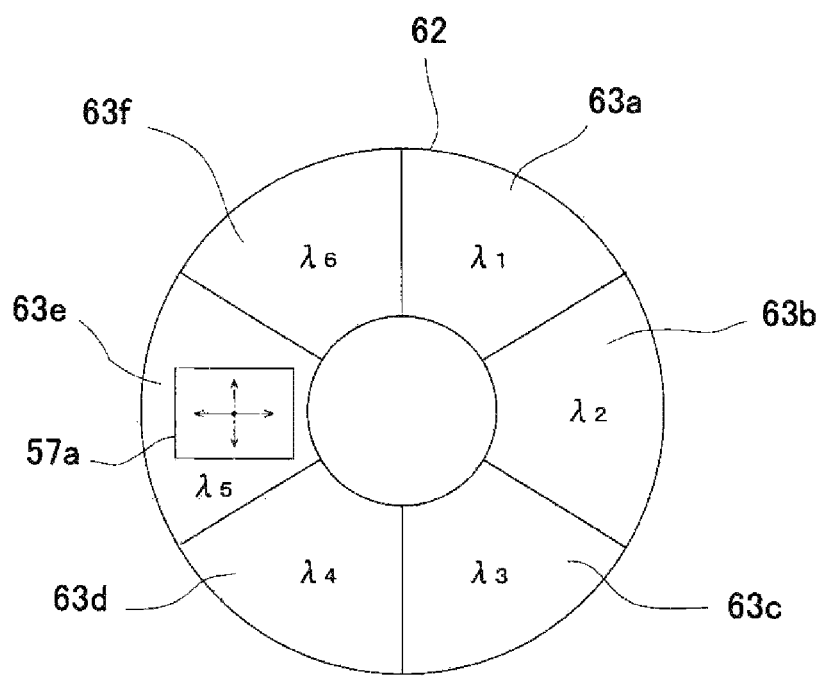
FIG. 10 is a front view to show the interference filter provided with a plurality of interference membranes with different characteristics.

FIG. 9A, FIG. 9B and FIG. 10 each represents another variation example.

The variation example shown in each of FIG. 9A, FIG. 9B and FIG. 10 has the same arrangement as the optical system 45' shown in the variation example of FIG. 8A and FIG. 8B, and a reflection type interference filter 62 is used.

The interference filter 62 is in shape of a circular disk as shown in FIG. 10, and is rotatably supported via a rotation axis 59. In the interference filter 62, reflection surface is equally divided (divided in 6 equal parts in the figure) in circumferential direction. Because the reflection surface is divided, divided reflection surfaces 63a to 63f can be formed as many as required (divided to 6 parts in the figure), and a different reflection interference filter with different wavelength selection characteristics is formed for each of the divided reflection surfaces 63a to 63f.

For instance, a reflection interference film having selection wavelength λ1 400 nm-450 nm is formed on the divided reflection surface 63a. Similarly, a reflection interference film having selection wavelength λ2 of 450 nm to 525 nm is formed on the divided reflection surface 63b, a reflection interference film having selection wavelength λ3 of 525 nm-650 nm is formed on the divided reflection surface 63c, a reflection interference film having selection wavelength λ4 of 650 nm-750 nm is formed on the divided reflection surface 63d, a reflection interference film having selection wavelength λ5 of 750 nm-870 nm is formed on the divided reflection surface 63e, and a reflection interference film having selection wavelength λ6 of 870 nm-950 nm is formed on the divided reflection surface 63f.

An objective lens 47, a first relay lens 48, and a diaphragm 55 are arranged along an optical axis 46. A second relay lens 49 is arranged along an optical axis, which runs in parallel to the optical axis 46 and is separated from the optical axis 46 at a predetermined distance, and the interference filter 62 is arranged at a position opposite to the second relay lens 49. Luminous fluxes reflected by the interference filter 62 are deflected by a reflection mirror 64, and the luminous fluxes thus deflected pass through an image forming lens 51, and an image is formed on an image pickup element 52. In FIG. 10, reference numeral 57a represents an image formed by a principal ray 57.

In this another example, the first relay lens 48 and the diaphragm 55 are at positions deviated from the optical axis 46 of the second relay lens 49, therefore the principal ray 57, which is divided by the tele-centric optical system 56, enters the interference filter 62 in tilted condition. Further, as shown in FIG. 9B, when the diaphragm 55 is moved so that the diaphragm 55 is separated from the optical axis 46, the incident angle of the principal ray 57 will be still larger. Therefore, by moving the diaphragm 55, it is possible to change the selected wavelength.

Further, when the optical spectrum to be obtained is in the range of 400 nm to 950 nm, the divided reflection surface is sequentially changed over from the divided reflection surface 63a to the divided reflection surface 63f. The diaphragm 55 is moved for each of the divided reflection surface 63 thus changed over, and an image is acquired with wavelength for each of the position, to which the diaphragm 55 is moved. The changeover of the divided reflection surfaces 63a to 63f is performed synchronously with the moving of the diaphragm 55. Each time the divided reflection surfaces 63 are changed over, the slit hole returns to a position separated at the most from the position of the optical axis 46 (i.e. reference position), and then the diaphragm 55 is moved for each predetermined amount.

By associated operation of the rotation of the interference filter 62 with the moving of the diaphragm 55, the wavelength is selected in the range of 400 nm to 950 nm. An image is acquired by the image pickup element 52 for each of the selected wavelength, and an optical spectrum can be obtained for total range of 400 nm to 950 nm.

In a case where the wavelength range of the optical spectrum to be obtained is limited, a divided reflection surface having the corresponding wavelength selection characteristics may be selected and the optical spectrum is obtained.

In the above, it is described that the interference filter 62 is designed in form of a circular disk and the interference filter 62 can be rotated, while it may be so arranged that the interference filter 62 is designed in form of a long rectangle, and that the interference filter 62 is divided in longitudinal direction to form the divided reflection surfaces. Then, the interference filter 62 is slid in longitudinal detection and the divided reflection surface may be changed over.

In the embodiment as shown in each of FIG. 5A and FIG. 5B, it may be so arranged that the disk of a transmission type interference filter 58 is equally divided to a predetermined number of disks, and an interference film having different wavelength characteristics for each divided part is formed. Then, similarly to the variation examples shown in each of FIG. 9A, FIG. 9B and FIG. 10, the interference filter 58 is rotated and the optical spectral image for each of the divided parts may be acquired.

Now, referring to FIG. 11, description will be given below on operation in the present embodiment. The following description describes a case where the interference filter is divided, and the site thus divided has different transmission characteristics in an optical system 45 as shown in FIG. 5A and FIG. 5B or in an optical system 45' shown in FIG. 8A, FIG. 8B and in FIG. 9A and FIG. 9B as a spectral camera 15.

As described above, in the present embodiment, a real image and an optical spectral image are acquired.

A still image (an left image 42) is acquired at a point O1 by the image camera 14, and the position of point O1 is measured by the GPS device 9. The still image acquired is stored in the image data recording unit 23. Further, from the still image at the point O1, at least five feature points (preferably, a multiple number of the feature points) are extracted by the image processing unit 29. When the helicopter 1 is moved from the point O1 to the point O2, tracking by video image is performed on the feature points. Then, a still image (a right image 43) is acquired at the point O2 by the image camera 14. By the GPS device 9, the position of the point O2 is measured. By the image processing unit 29, at least five of the feature points are specified in the still image at the point O2, and matching is performed on the still image at the point O1 and on the still image at the point O2 according to the feature points. Further, by the measuring unit 33, digital photogrammetry is performed based on the still image acquired at the point O1 and the still image acquired at the point O2.

At the same time as the acquisition of the still images at the point O1 and at the point O2, an optical spectral image is acquired by the spectral camera 15.

To acquire the optical spectral image, the helicopter 1 is set in stationary state (in hovering state), and the position of the diaphragm 55 is sequentially changed. The wavelength to be selected by the interference filter 58 is changed, and an image is acquired for each of the wavelength thus selected. The optical spectral image is acquired with a range of wavelength set up in advance.

In a case where the range of the wavelength thus set up (i.e. λ1 to λn) exceeds the range of the wavelength, which is obtained by changing the incident angle of the principal ray 57 on one interference film, the interference filter 58 is rotated, and wavelength characteristics of the site where the principal ray 57 enters are changed. Further, optical spectrum in the wavelength range obtained by the moving of the diaphragm 55 is acquired.

The optical spectral images acquired as described above are stored in the spectral data storage unit 27.

By synthesizing the optical spectral images stored at the point O1 and at the point O2 respectively, an optical spectrum synthesized image including the optical spectral images acquired at the point O1 and at the point O2 in the preset wavelength range (λ1 to λn) can be synthesized. Further, by synthesizing the optical spectral synthesized image at the point O1 and the still image at the point O1, a hyper-spectral images acquired at the point O1 is synthesized. Then, by synthesizing the optical spectrum synthesized image at the point O2 and the still image at the point O2, a hyper-spectral image acquired at the point O2 is synthesized.

Further, image matching (stereo-matching) is performed on the still image at the point O1 and on the still image at the point O2 based on the feature points. Then, by associating the results of the digital photogrammetry with the still images, an image having three-dimensional positional data (3D model image) can be prepared. Further, at least one of the optical spectral synthetic image at the point O1 and the optical spectral synthetic image at the point O2 is associated with the 3D model image.

As described above, the still image and the optical spectral image correspond to each other in a one-to-one relation, and when one point in the still image is specified, an optical spectrum at the specified point can be immediately acquired from the spectral synthetic image, and three-dimensional positional data can be obtained from the 3D model image.

Thus, the hyper-spectral images can be acquired at the point O1 and at the point O2, and a 3D model image having the optical spectral information, i.e. a 4D model image, can be acquired.

Therefore, it is possible to recognize a growing condition of agricultural products from the optical spectrum, and to identify the size of the agricultural product from three-dimensional data of the agricultural product. Or, it is possible to acquire information of the ground surface which includes information of the type of substance exposed at the same time.

Next, when the helicopter 1 is set in hovering state and the optical spectral image is acquired, the posture is constantly changing, and this condition cannot be defined as a complete standstill. Therefore, there are some differences in the images, which are acquired for each of the wavelengths. For this reason, if the optical spectral images stored in the spectral data storage unit 27 are synthesized as they actually are, a problem may arise such that error occurs, or the images are blurred (grow dim) or other problems.

Figure 12A:
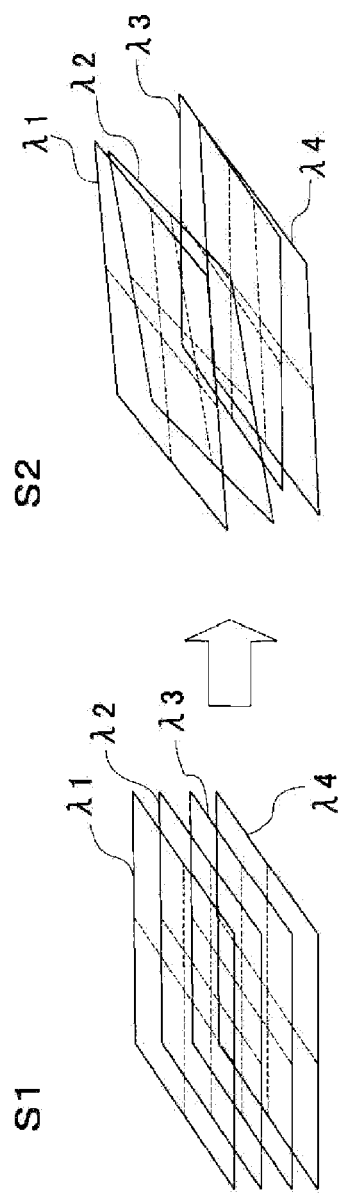
FIG. 12A and FIG. 12B each represents an explanatory drawing to show conditions between images in a case where a plurality of images are acquired by a helicopter flying in hovering state.
Figure 12B:
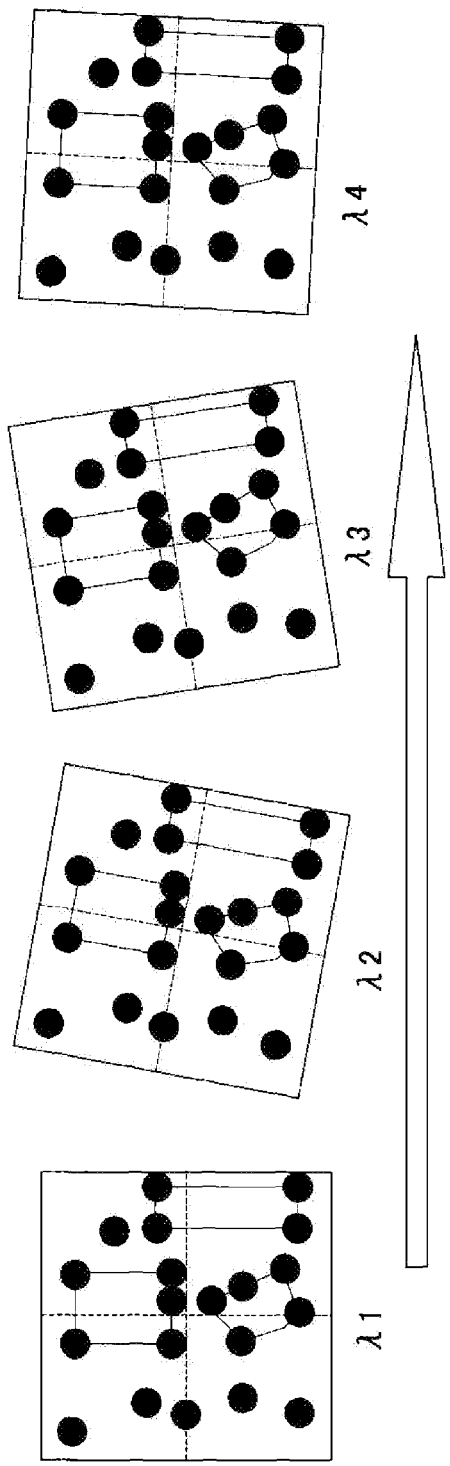

FIG. 12A and FIG. 12B each represents a condition where optical spectral images, each having selected wavelength of $\lambda 1$, $\lambda 2$, $\lambda 3$ and $\lambda 4$ respectively, are acquired in hovering state. Reference symbol S1 in FIG. 12A represents a condition where an image pickup device 11 is in completely standstill condition in hovering state, and reference symbol S2 represents a condition where the image pickup device 11 is moving. FIG. 12B is a drawing where optical spectral images of $\lambda 1$, $\lambda 2$, $\lambda 3$ and $\lambda 4$ acquired when the image pickup device 11 are moving are developed according to the course of time. In the figure, black circle represents a feature point extracted. As it is seen in FIG. 12A and FIG. 12B, when the images are synthesized as they actually are, the feature points do not concur with each other between the images, and it is seen that error has occurred or the images are blurred.

Accordingly, it is necessary that the matching (relative positioning) is performed so as to be able to synthesize optical spectral images which are acquired for each of the wavelengths in the hovering state.

By the spectral camera 15, even in the operation to take images of the optical spectral images, real images can be acquired at predetermined time interval as set in advance (or in continuous images) by the image camera 14 in synchronization with the spectral camera 15, and the image tracking is carried out.

Feature points are extracted for each of the frame images, and image tracking is sequentially performed on the feature points for the frame images, which are adjacent to each other in terms of time, and the feature points obtained in a frame image preceding in term of time (hereinafter, referred as "the first frame image") are specified in a subsequent frame image (hereinafter, referred as "the second frame image").

Based on the feature points, positioning is performed between the preceding frame image and the subsequent frame image. Based on the condition obtained by this positioning, positioning (matching) can be performed for the optical spectral image corresponding to the preceding frame image and a subsequent optical spectral image corresponding to the subsequent frame image.

In a case where the optical spectral image is acquired for each of the frame images, the image tracking is carried out continuously for the frame image.

By the image tracking, the feature points are specified to the first frame image, which corresponds to an optical spectral image preceding in terms of time (hereinafter, referred as "the first optical spectral image"). Further, the feature points are specified for the second frame image, which corresponds to the optical spectral image adjacent in terms of time (the second optical spectral image).

In a case where the time elapses between the first frame image and the second frame image, and tilting of the optical axis or the like occurs between these two images, coordinates conversion is carried out according to the feature points between the two frame images, and the image matching is performed.

As described above, the real image acquired by the image camera 14 and the optical spectral image acquired in synchronization with the real image correspond to each other in a one-to-one relation. Thus, the condition obtained by the coordinates conversion between the first frame image and the second frame image can be directly applied to the matching of the first optical spectral image and the second optical spectral image.

Further, by carrying out the matching (synthesizing) of the optical spectral imaged in parallel to the matching of the real images, synthesis of the optical spectral images without error can be carried out.

When the synthesis of the optical spectral images as described above is sequentially performed on all of the optical spectral images as acquired in the hovering state, it is possible to acquire the optical spectral synthesized image similar to the optical spectral images as acquired in the standstill state.

Figure 14:
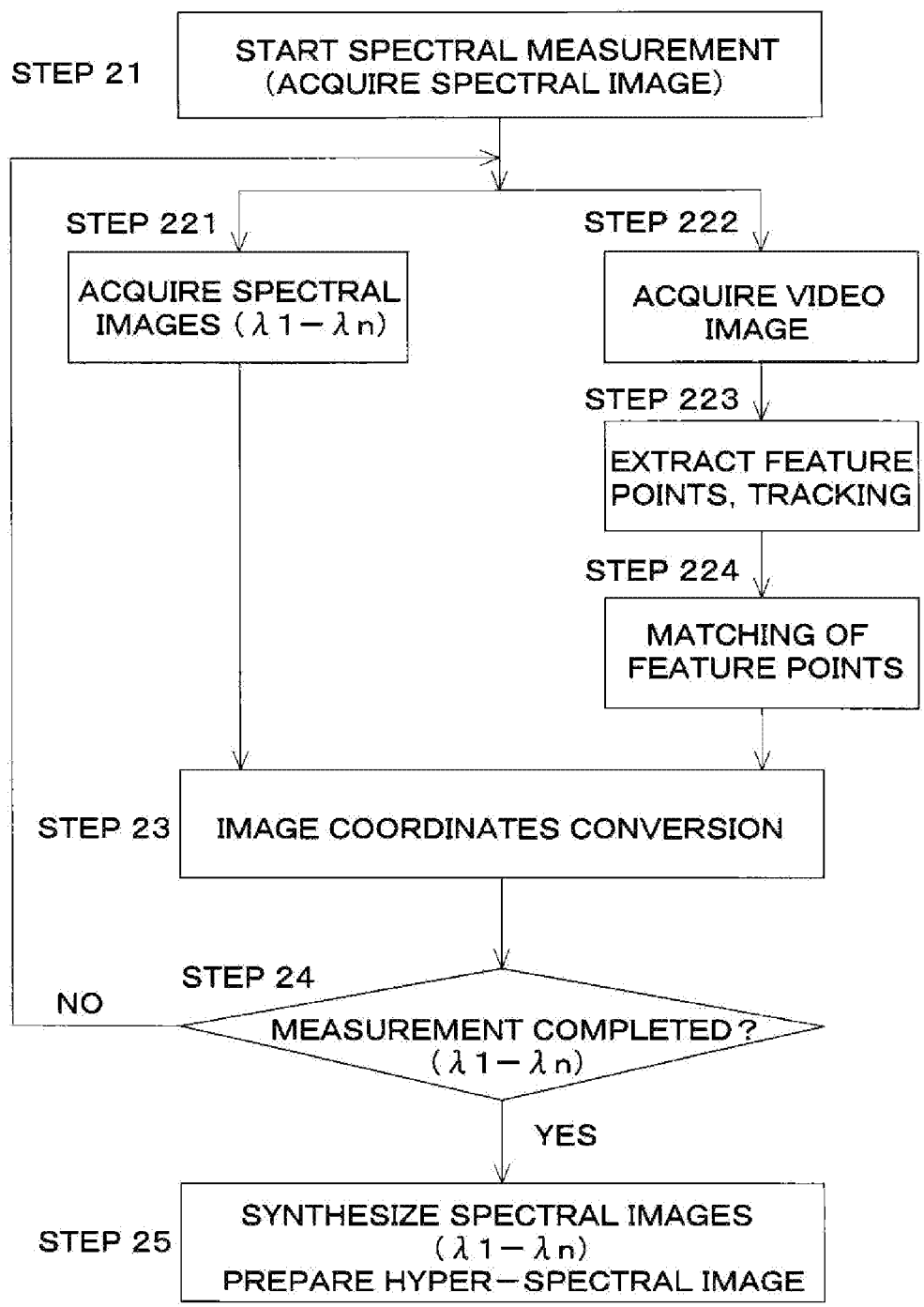
FIG. 14 is a flow chart to show details of Step 03 and Step 08 in FIG. 13.

By referring to FIG. 13 and FIG. 14, description will be given below on the digital photogrammetry and on acquisition and synthesis of the optical spectral image and the hyper-spectral image or the like.

(Step 01) The hovering of the helicopter 1 is started at the point O1, and the left image 42 is acquired by the image camera 14 at the point O1. Also, the measurement of the position of the helicopter 1 (i.e. the position O1) by the GPS device 9 is carried out.

(Step 02) The feature points are extracted by the procedure such as edge processing on the left image 42 acquired.

(Step 03) The video images are acquired by the image camera 14, and the optical spectral images are acquired by the spectral camera 15 in synchronization with the operation of the image camera 14. Image tracking at the same position (hereinafter, referred as "the same position tracking") is carried out at the same position by the video images in parallel to the acquisition of the optical spectral images. Based on the result of the video image tracking, image position correcting is performed between each of the optical spectral images.

Now, description will be given on the acquisition of optical spectral images at the point O1 and on the image position correcting in Step 21 to Step 25.

(Step 21 and Step 221) The optical spectral images in the predetermined wavelength range ($\lambda 1$ to $\lambda n$) are acquired for each wavelength in a predetermined time interval. The optical spectral images thus acquired are stored in the spectral data storage unit 27 in time series. At the same time as the acquisition of the optical spectral images, video images (the real images acquired by the image camera 14) are acquired (Step 222). During the time interval when the optical spectral images are acquired, the video images are continuously acquired, and the image tracking is carried out between the frame images which constitute the video images.

(Step 223 and Step 224) In the image tracking (the same position tracking), the feature points are extracted from the frame image (the first frame image), which is synchronized in terms of time with the acquisition of the optical spectral image ($\lambda 1$), and the feature points are specified by the image tracking to the subsequent frame image adjacent in terms of time. The image tracking is carried out continuously, and the feature points are specified on the frame image (the second frame image) synchronized with the subsequent optical spectral image ($\lambda 2$), which are adjacent in terms of time.

(Step 23) Based on the feature points of the first frame image thus acquired and on the feature points of the second frame image, the matching is performed between the first frame image and the second frame image, and the coordinates conversion is performed between the first frame image and the second frame image is carried out.

The image camera 14 and the spectral camera 15 acquire the images on the same axis. Each pixel of the frame image and each pixel of the optical spectral images correspond to each other in a one-to-one relation, and the condition of the matching of the frame images and the conditions of coordinates conversion can also be applied to the optical spectral images, which are adjacent to each other in terms of time.

(Step 24) It is judged whether all spectral images with all wavelengths are acquired or not. If all spectral images are not acquired, it is returned to Step 221 and Step 222, and the acquisition of the optical spectral image and the same position tracking are carried out continuously.

(Step 25) When the optical spectral images for all wavelengths of a predetermined wavelength range ($\lambda 1$ to $\lambda n$) have been acquired, all optical spectral images are synthesized under the condition obtained by the video image tracking and the optical spectral synthesized images having optical spectra in the predetermined wavelength range ($\lambda 1$ to $\lambda n$) at the point O1 can be acquired. Further, by synthesizing the optical spectral synthesized image with the still images, the hyper-spectral image can be acquired.

(Step 04 to Step 06) When the still image and the hyper-spectral image at the point O1 have been acquired, the helicopter 1 is moved to the point O2. During the moving, the video image is acquired by the image camera 14, and the image tracking (moving tracking) is performed. The moving tracking may be carried out based on the feature points extracted at the left image 42 or the moving tracking may be carried out by using the feature points finally obtained by the same position tracking in hovering state.

(Step 07) When the helicopter 1 reaches the point O2, the moving tracking is completed. The hovering is started, and the right image 43 is acquired.

(Step 08) In the hovering state, while acquiring the video images by the image camera 14, the optical spectral image is acquired by the spectral camera 15 in synchronization with the image camera 14. The image tracking at the same position (the same position tracking) by the video image is executed at the same time as acquiring of the optical spectral image, and correction of the image position between the optical spectral images is carried out based on the result of the same position tracking.

The procedures of Step 21 to Step 25 are carried out, and optical spectral images for all wavelengths of the predetermined wavelength range ($\lambda 1$ to $\lambda n$) at the point O2 are acquired and the optical spectral synthesized images having optical spectra in the predetermined wavelength range ($\lambda 1$ to $\lambda n$) at the point O2 are acquired by synthesizing all optical spectral image thus obtained. Further, by synthesizing the optical spectral synthesized images with the right image 43, the hyper-spectral image is acquired.

(Step 09, Step 10 and Step 11) Based on the feature points specified in the right image 43 and on the feature points specified in the left image 42, matching is performed. Also, coordinates conversion (relative orientation) with one of the left image 42 or the right image 43 as reference is conducted. Further, the coordinates conversion (absolute orientation) to the geocentric coordinates is carried out based on a result of measurement at the point O1 and O2 by the GPS device 9.

(Step 12 and Step 13) Based on the result of the absolute orientation, stereo-matching of the left image 42 and the right image 43 is conducted, and a topographical 3D model having three-dimensional positional data is obtained.

(Step 14) As described above, since the optical spectral image and the still image correspond to each other in a one-to-one relation, the three-dimensional positional data are acquired at a position where the optical spectra are obtained. By synthesizing the optical spectral image with the 3D model, a four-dimensional model having the topographical three-dimensional positional data and the optical spectral information can be prepared.

Figure 15:
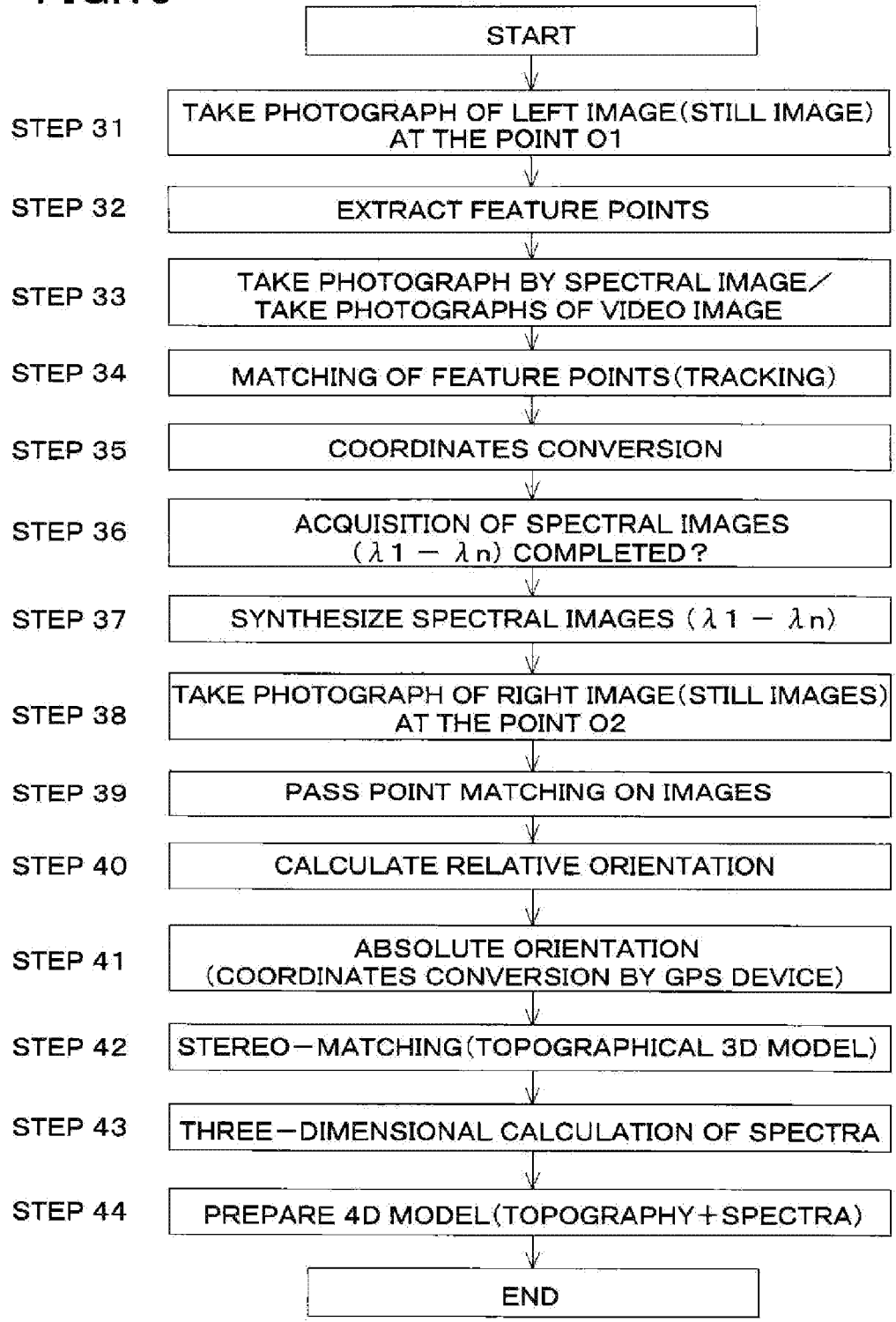
FIG. 15 is a flow chart to explain operation in a second embodiment of the present invention.

Next, referring to FIG. 15, description will be given on a second embodiment.

Figure 2:
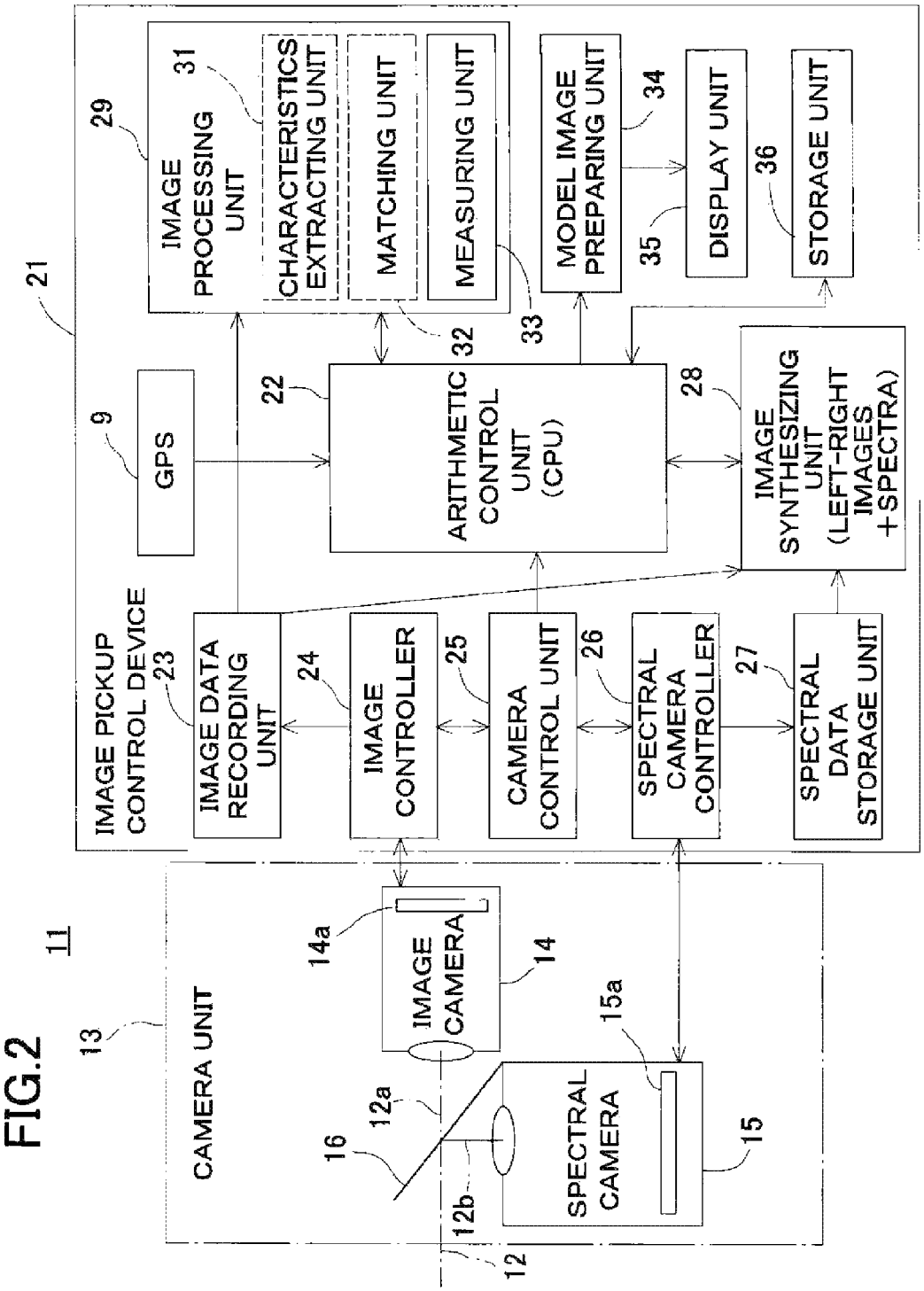
FIG. 2 is a schematical block diagram of a camera unit of the image pickup device and an image pickup control device.

In the second embodiment, the arrangement that an image pickup device 11 shown in FIG. 2 is mounted on a helicopter 1 as shown in FIG. 1 is the same as in the case of the first embodiment, and detailed description is not given here.

In the second embodiment, without the hovering of the helicopter 1 at the point O1 and at the point O2, still images of a left image 42 and a right image 43 are acquired at the point O1 and at the point O2 by the image camera 14. Further, in a process where the helicopter is moved continuously from the point O1 to the point O2, the optical spectral image is acquired by a spectral camera 15. The flying speed of the helicopter 1 is such that there is no substantial deviation between the optical spectral images, which occur as reversed in terms of time.

(Step 31 to Step 38) The left image 42 is acquired at the point O1. At least five of the feature points are extracted by the procedure such as edge processing of the left image 42 or other processing. Further, the video images are continuously acquired by the image camera 14, and the feature points are specified in the frame images, which constitute the video images. Then, in synchronization with the acquisition of the video images, in synchronization with each frame image, or in synchronization with the frame images acquired at two or more time intervals, optical spectral images can be acquired by the spectral camera 15.

Between the frame images which are adjacent to each other in terms of time, the image matching is carried out based on the feature points. Based on the result of the image matching, matching of the optical spectral images corresponding to the frame images is conducted.

Regarding the optical spectral images sequentially acquired, the sequential matching is performed based on the result of the matching of the video images which are acquired at the same time as the optical spectral images. The optical spectral images are acquired in the intended wavelength range up to the wavelengths ($\lambda 1$ to $\lambda n$) until the helicopter reaches the point O2 from the point O1. The synthesis of the optical spectral images is carried out in a manner similar to the procedures in Step 21 to Step 25 in the first embodiment.

When the helicopter 1 reaches the point O2, the right image 43 is acquired by the image camera 14, and the feature points extracted in the left image 42 are specified in the right image 43. To specify the feature points in the right image 43, the results of the image tracking sequentially between the frame images during the moving should be reflected.

(Step 39, Step 40 and Step 41) Based on the feature points specified in the right image 43 and also on the feature points specified in the left image 42, the matching is performed. Relative orientation is carried out either the left image 42 or the right image 43 as reference. Further, absolute orientation is conducted to the geocentric coordinates system based on the result of measurement of the GPS device 9.

(Step 42 and Step 43) Based on the result of the absolute orientation, stereo-matching is performed between the left image 42 and the right image 43, and a topographical 3D model having the three-dimensional positional data is obtained.

(Step 44) Further, by synthesizing the optical spectral image with the 3D model, a four-dimensional model having topographical three-dimensional positional data and the optical spectral information can be prepared.

As described above, in the second embodiment, it is arranged that the hovering process is omitted and that the optical spectral images in the hovering process are acquired during the moving of the helicopter 1.

In the embodiment as described above, it is so arranged that two-dimensional images are acquired for each of the specific wavelength as selected by the interference filter as the spectral camera 15 and by regarding the selection range of the wavelength as the desired wavelength range, the optical spectral images are acquired in the desired wavelength, while the other spectral camera can be adopted for the purpose. By using the other spectral camera, images may be acquired along a line, which goes across a field of view of the camera, and the optical spectral image may be acquired in such a manner that images may be acquired by resolving the images along the line thus obtained to the optical spectra by using diffraction grating and by scanning the line over the total field of view of the camera.

The invention claimed is:

1. An image acquiring device, comprising: a first camera for acquiring video images, consisting of frame images continuous in time series; a second camera having an optical axis in common with said first camera and being in a known relation with said first camera and used for synchronizing with said frame images and acquiring two or more optical spectral images of an object to be measured by different wavelengths; and an image pickup control device, wherein each pixel of image pickup elements of the first camera corresponds to each pixel of image pickup elements of the second camera in a one-to-one relation and said second camera comprises an optical system which has a tele-centric optical system as a wavelength changing means and an interference filter tilted with respect to an optical axis of said second camera, a diaphragm of said tele-centric optical system is provided so as to be movable along a direction perpendicular to said optical axis, and by moving said diaphragm and changing an angle of luminous fluxes entering said interference filter, said second camera acquires two or more optical spectral images in a predetermined wavelength range including two or more different wavelengths, wherein said image pickup control device extracts two or more feature points from first frame images, sequentially specifies said feature points in the frame images continuous in time series, performs image matching between the frame images regarding second frame images corresponding to said two or more optical spectral images based on said feature points, performs photogrammetry based on said first frame images and said second frame images, synthesizes said two or more optical spectral images with different wavelengths according to the condition obtained by said image matching, and associates distance data of each pixel acquired by photogrammetry with each pixel of synthesized optical spectral images.

2. An image acquiring device according to claim 1, wherein said image pickup control device performs relative positioning of each of the optical spectral images based on a position of said feature point on each frame image.

3. An image acquiring device according to claim 1, wherein said image pickup control device extracts at least five feature points from said first frame images of the video images taken by said first camera, specifies said at least five feature points in said second frame image by image tracking, performs stereo-matching based on said feature points of both images, and prepares a three-dimensional model of said object to be measured.

4. An image acquiring device according to claim 3, wherein said image pickup control device combines information of wavelength components of said synthesized optical spectral images to said three-dimensional model.

5. An image acquiring device according to claim 1, wherein the optical spectral images acquired by said second camera are acquired as two-dimensional images relating to a predetermined wavelength range.

6. An image acquiring system, comprising: a flying object; a GPS device mounted on said flying object; a control device for controlling flight of said flying object; a first camera mounted on said flying object and for acquiring video images made up by frame images continuous to each other in time series; a second camera having an optical axis in common with said first camera and provided in a known relation with said first camera and for acquiring two or more optical spectral images with different wavelengths of an object to be measured; and an image pickup control device, wherein each pixel of image pickup elements of the first camera corresponds to each pixel of image pickup elements of the second camera in a one-to-one relation and said flying object moves from a first point to a second point, said GPS device measures a position of the first point and a position of the second point in geocentric coordinate system, said first camera acquires a still image of the first point, acquires video images during the moving from the first point to the second point, and further, acquires still images at the second point, wherein said second camera comprises an optical system which has a tele-centric optical system as a wavelength changing means and an interference filter tilted with respect to an optical axis of said second camera, wherein a diaphragm of said tele-centric optical system is provided so as to be movable along a direction perpendicular to said optical axis, and by moving said diaphragm and changing an angle of luminous fluxes entering said interference filter, said second camera acquires two or more optical spectral image in a predetermined wavelength range including two or more different wavelengths, and wherein said image pickup control device extracts two or more feature points from the still image at the first point, performs video image tracking from the video image during the moving from the first point to the second point, specifies said feature points in the still image at the second point, performs stereo-matching of the still image at the first point with the still image at the second point based on said feature points, prepares a three-dimensional model based on positions of said first point and said second point in the geocentric coordinate system, and said image pickup control device synthesizes two or more optical spectral images with different wavelengths, prepares an optical spectral synthetic image based on the condition of stereo-matching, synthesizes said three-dimensional model with said optical spectral synthetic image, and prepares a four-dimensional model having three-dimensional position data and optical spectral information of said object to be measured.

7. An image acquiring system according to claim 6, wherein said second camera acquires two or more optical spectral images with different wavelengths during a hovering flight at the first point and acquires two or more optical spectral images with different wavelengths during a hovering flight at the second point, said image pickup control device synthesizes two or more optical spectral images of the first point, prepares a first optical spectral synthetic image, synthesizes two or more optical spectral images of the second point, prepares a second optical spectral synthetic image, synthesizes said three-dimensional model with at least one of said first optical spectral synthetic image and said second optical spectral synthetic image, and prepares a four-dimensional model having three-dimensional positional data and optical spectral information of said object to be measured.

8. An image acquiring system according to claim 7, wherein said first camera acquires a same position video image in said hovering flight, said image pickup control device performs synchronization on frame image of said same position video image, acquires an optical spectral image by said second camera, performs image tracking between frame images, performs image matching of two frame images corresponding to two optical spectral images continuous in terms of time, synthesizes said two optical spectral images under the condition obtained by said image matching, sequentially repeats said image matching of said frame images and synthesizing of the optical spectral images, and synthesizes all optical spectral images acquired during said hovering flight.

9. An image acquiring system according to claim 6, wherein said second camera acquires two or more optical spectral images with different wavelengths in a predetermined wavelength range during the moving from the first point to the second point.

10. An image acquiring system according to claim 9, wherein said image pickup control device acquires an optical spectral image which synchronizes with the frame image of said video image by said second camera, performs image tracking between the frame images, performs image matching of two frame images corresponding to two optical spectral images continuous in terms of time, synthesizes said two optical images under the condition as obtained in said image matching, sequentially repeats said image matching of said frame image and synthesizing of the optical spectral image, and synthesizes all optical spectral images acquired during the course of said moving.

* * * * *